US010860463B2

(12) United States Patent
Yasuda et al.

(10) Patent No.: US 10,860,463 B2
(45) Date of Patent: Dec. 8, 2020

(54) OPERATION VERIFYING APPARATUS, OPERATION VERIFYING METHOD AND OPERATION VERIFYING SYSTEM

(71) Applicant: NOMURA RESEARCH INSTITUTE, LTD., Tokyo (JP)

(72) Inventors: Mamoru Yasuda, Tokyo (JP); Shunichi Matsumoto, Tokyo (JP); Takaya Higashino, Tokyo (JP); Eiji Nabika, Tokyo (JP); Hayato Takabatake, Tokyo (JP); Takuma Ishibashi, Tokyo (JP); Takuharu Mizoguchi, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 0 days.

(21) Appl. No.: 16/410,185

(22) Filed: May 13, 2019

(65) Prior Publication Data

US 2019/0266073 A1 Aug. 29, 2019

Related U.S. Application Data

(63) Continuation of application No. 15/167,113, filed on May 27, 2016, now Pat. No. 10,346,288, which is a (Continued)

(30) Foreign Application Priority Data

Mar. 30, 2009 (JP) ................................ 2009-083198
Feb. 5, 2010 (JP) ................................ 2010-024647

(Continued)

(51) Int. Cl.

| | |
|---|---|
| ***G06F 11/36*** | (2006.01) |
| ***G06F 11/22*** | (2006.01) |
| ***G06F 11/263*** | (2006.01) |

(52) U.S. Cl.

CPC ...... *G06F 11/3668* (2013.01); *G06F 11/2273* (2013.01); *G06F 11/263* (2013.01); *G06F 11/3664* (2013.01)

(58) Field of Classification Search

CPC ............... G06F 11/2273; G06F 11/263; G06F 11/3664; G06F 11/3668; G06F 11/3604

See application file for complete search history.

(56) References Cited

U.S. PATENT DOCUMENTS 5,513,300 A * 4/1996 Shibazaki ............ H04N 1/3871 345/634
6,360,332 B1 * 3/2002 Weinberg ............ G06F 11/3664 714/38.13

(Continued)

FOREIGN PATENT DOCUMENTS

| | | |
|---|---|---|
| JP | 2001-005690 | 1/2001 |
| JP | 2002-236598 | 8/2002 |

(Continued)

OTHER PUBLICATIONS

International Search Report dated Apr. 20, 2010 in corresponding International Patent Application No. PCT/JP2010/000722.

(Continued)

*Primary Examiner* — Stephanie E Bloss
(74) *Attorney, Agent, or Firm* — Amster, Rothstein & Ebenstein LLP

(57) ABSTRACT

An operation verifying apparatus of a first embodiment acquires a log indicating the content of a sequence of operations performed on a predetermined device, identifies corresponding functions from the log, and automatically generates a program based on the identified functions. Input data, which is to serve as an argument of each of these functions, is set. Execution sets as well as test scenarios are each structured by combining a program and input data.

(Continued)

Then each execution set is continuously executed. As a result, an operation test using a test program is executed.

15 Claims, 23 Drawing Sheets

Related U.S. Application Data continuation of application No. 13/067,009, filed on May 2, 2011, now Pat. No. 9,495,280, which is a continuation of application No. PCT/JP2010/000722, filed on Feb. 5, 2010.

(30) Foreign Application Priority Data

Feb. 5, 2010 (JP) ................................ 2010-024648
Feb. 5, 2010 (JP) ................................ 2010-024649
Feb. 5, 2010 (JP) ................................ 2010-024650
Feb. 5, 2010 (JP) ................................ 2010-024651
Feb. 5, 2010 (JP) ................................ 2010-024652

(56) References Cited

U.S. PATENT DOCUMENTS 7,949,901 B2 5/2011 Yano et al.
2003/0005044 A1* 1/2003 Miller ................ G06F 11/3664 709/203
2004/0216084 A1 10/2004 Brown et al.
2005/0268171 A1* 12/2005 House ................ G06F 11/2273 714/32
2006/0122913 A1* 6/2006 Chen ................ G06Q 30/0633 705/26.8
2008/0126931 A1 5/2008 Kojima et al.
2008/0156863 A1 7/2008 Abrott
2008/0229149 A1 9/2008 Penton
2008/0244317 A1* 10/2008 Yano .................... G06F 11/263 714/37
2008/0270841 A1* 10/2008 Quilter ................ G06F 11/3696 714/38.1
2008/0292164 A1 11/2008 Azar et al.
2009/0192836 A1* 7/2009 Kelly ................ G06Q 30/0203 705/7.32
2009/0254988 A1 10/2009 Nonaka et al.

FOREIGN PATENT DOCUMENTS

JP 2004-227396 8/2004
JP 2007-102654 4/2007
JP 2008-117093 5/2008

OTHER PUBLICATIONS

Chinese Office Action dated Aug. 3, 2012 in corresponding Chinese Patent Application No. 201080003435.1.
Non-Final Office Action dated Mar. 28, 2014 in corresponding U.S. Appl. No. 13/067,009 (16 pages).
Non-Final Office Action dated Dec. 18, 2014 in corresponding U.S. Appl. No. 13/067,009 (21 pages).
Final Office Action dated May 11, 2015 in corresponding U.S. Appl. No. 13/067,009 (22 pages).
Non-Final Office Action dated Dec. 8, 2015 in corresponding U.S. Appl. No. 13/067,009 (19 pages).
Advisory Action dated Sep. 23, 2015 in corresponding U.S. Appl. No. 13/067,009 (4 pages).
Notice of Allowance dated Jun. 30, 2016 in Parent U.S. Appl. No. 13/067,009 (16 pages).
U.S. Appl. No. 13/067,009, filed May 2, 2011, Yasuda et al., Nomura Research Institute Ltd., Tokyo, Japan.

* cited by examiner

FIG.2

```
Browser("XYZ!").Page("XYZ!").WebEdit("p").Set "test "
Browser("XYZ!").Page("XYZ!").Link(" dictionary ").Click
Browser("XYZ!").Page("XYZ! dictionary - All dictionaries - test ").
Link(" test (test)").Click
```

```
'*****************************************************************
*****
'WORK SCREEN:  /
'DATE OF PREPARATION: 2008/05/01
'PREPARED BY:
'*****************************************************************
*****

'No.1
Call WebEditSet(Browser("XYZ!").Page("XYZ!").WebEdit("p"), DataTable("
 p 1 ", dtGlobalSheet))
'No.2
Call LinkClick(Browser("XYZ!").Page("XYZ!").Link("dictionary"))
'No.3
Call LinkClick(Browser("XYZ!").Page("XYZ!dictionary - all dictionaries -
test").Link("test [ test ] "))
'No.4
Call TextCheck(Browser("XYZ!dictionary- all dictionaries -
profession").Page("XYZ!dictionary- all dictionaries - profession"),
DataTable(" CheckText ", dtGlobalSheet), "", "")

'A function to set a value in WebEdit
'param1:obj:An object to be operated
'param2:val:A value to be set
Function WebEditSet(obj, val)
    If val <> "" Then
        If val = "BLANK" Then
            obj.Set ""
        Else
            obj.Set val
        End If
    End If
End Function

'A function to click on Link
'param1:obj:An object to be operated
Function LinkClick(obj)
    Call Capture()
    obj.Click
End Function

'A function to check if a character string is displayed in HTML on the screen
'param1:obj:An object to be checked
'param2:val:A character string to be checked(String)
'param3:blnToggleFlag:Invert check decision (Boolean)
'                      Execute as False if ""
'param4:lngTimeout:Time-out time of a check (seconds)
'                      Execute as 1 if ""
Function TextCheck(obj, val, blnToggleFlag, lngTimeout)
    Dim blnRet      'A result of decision on the existence of the character
                     string to be checked
    'Synchronize the browser displayed on the screen
     (wait for the completion of the updating)
    'If Browser(":=").Exist Then
    '    'If only a single browser is available
    '    Browser(":=").Sync
                          ⋮
```

330

200

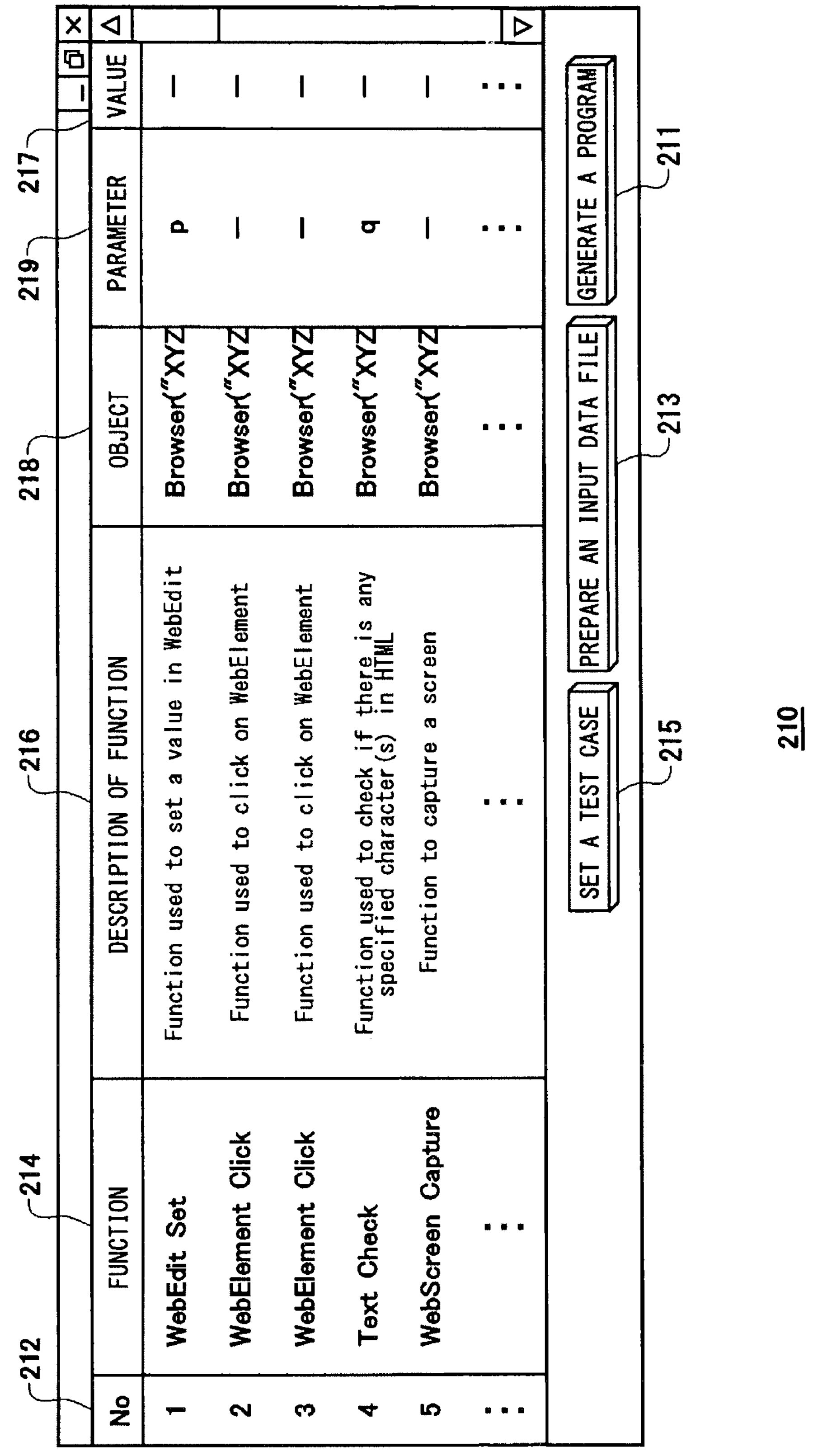

FIG.7

| No | FUNCTION | DESCRIPTION OF FUNCTION | OBJECT | PARAMETER | VALUE |
|---|---|---|---|---|---|
| 1 | WebEdit Set | Function used to set a value in WebEdit | Browser("XYZ | p | — |
| 2 | WebElement Click | Function used to click on WebElement | Browser("XYZ | — | — |
| 3 | WebElement Click | Function used to click on WebElement | Browser("XYZ | — | — |
| 4 | Text Check | Function used to check if there is any specified character(s) in HTML | Browser("XYZ | q | — |
| 5 | WebScreen Capture | Function to capture a screen | ... | — | — |
| ... | ... | ... | | | |

[SET A TEST CASE] [PREPARE AN INPUT DATA FILE] [GENERATE A PROGRAM]

210

220

230

| No. | BRIEF DESCRIPTION OF AN EXECUTION SET | PROGRAM | INPUT DATA FILE |
|---|---|---|---|
| 1 | LOGIN | login.vbs | login.xls |
| 2 | NEWS CHECK | ncheck.vbs | — |
| 3 | STOCK SELLING | sellstock.vbs | stock1.xls |
| 4 | BOND SELLING | sellfincom.vbs | fincom1.xls |
| 5 | CHANGE OF ADDRESS | ChAddress.vbs | address2.xls |
| 6 | LOGOUT | logout.vbs | — |
| ⋮ | ⋮ | ⋮ | |

244 — 245 — 246 — 247

EXECUTE A TEST — 248

240

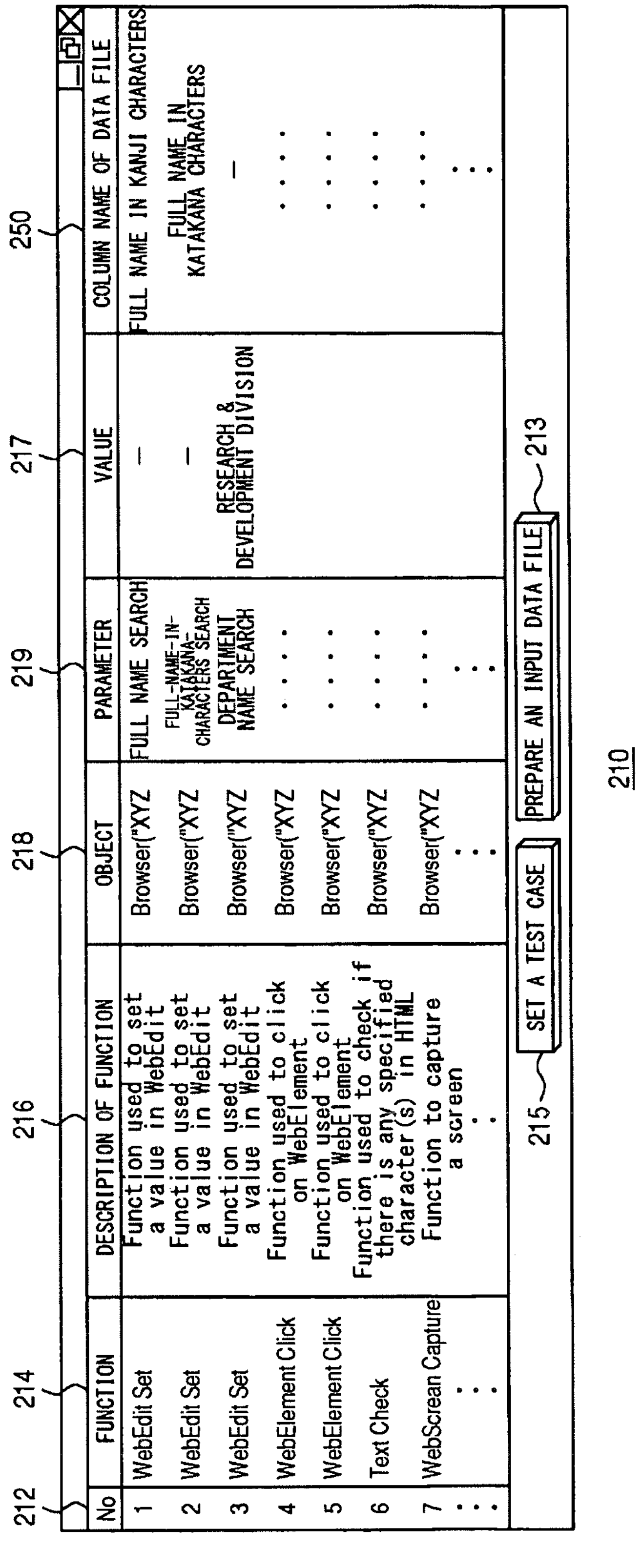

FIG.15

| No | FUNCTION | DESCRIPTION OF FUNCTION | OBJECT | PARAMETER | VALUE | COLUMN NAME OF DATA FILE |
|---|---|---|---|---|---|---|
| 1 | WebEdit Set | Function used to set a value in WebEdit | Browser("XYZ | FULL NAME SEARCH | — | FULL NAME IN KANJI CHARACTERS |
| 2 | WebEdit Set | Function used to set a value in WebEdit | Browser("XYZ | FULL-NAME-IN-KATAKANA-CHARACTERS SEARCH | — | FULL NAME IN KATAKANA CHARACTERS |
| 3 | WebEdit Set | Function used to set a value in WebEdit | Browser("XYZ | DEPARTMENT NAME SEARCH | RESEARCH & DEVELOPMENT DIVISION | — |
| 4 | WebElement Click | Function used to click on WebElement | Browser("XYZ | . | . | . |
| 5 | WebElement Click | Function used to click on WebElement | Browser("XYZ | . | . | . |
| 6 | Text Check | Function used to check if there is any specified character(s) in HTML | Browser("XYZ | . | . | . |
| 7 | WebScreen Capture | Function to capture a screen | . | . | . | . |
| ... | | | | | | |

[SET A TEST CASE] [PREPARE AN INPUT DATA FILE]

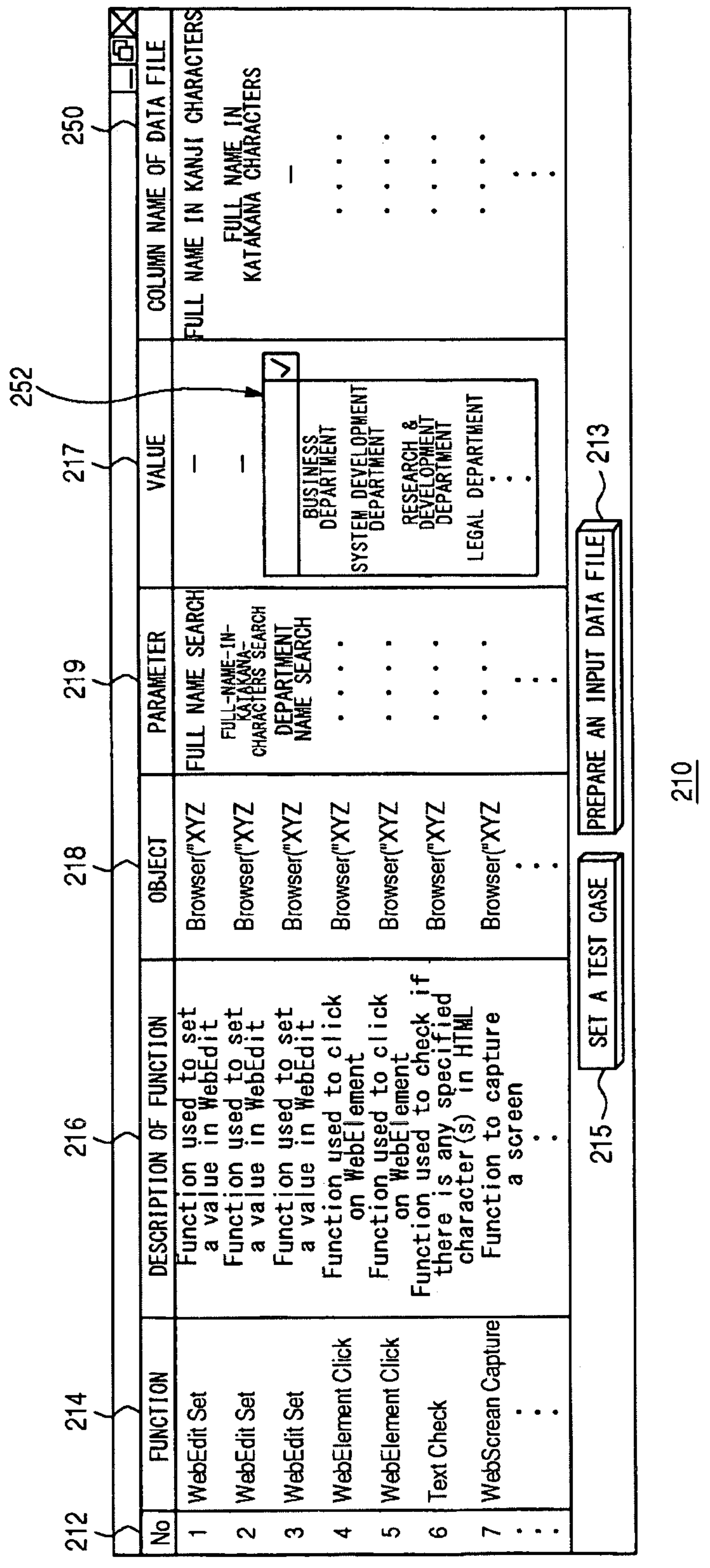

FIG.16

| No | FUNCTION | DESCRIPTION OF FUNCTION | OBJECT | PARAMETER | VALUE | COLUMN NAME OF DATA FILE |
|---|---|---|---|---|---|---|
| 1 | WebEdit Set | Function used to set a value in WebEdit | Browser("XYZ... | FULL NAME SEARCH | — | FULL NAME IN KANJI CHARACTERS |
| 2 | WebEdit Set | Function used to set a value in WebEdit | Browser("XYZ... | FULL-NAME-IN-KATAKANA-CHARACTERS SEARCH | — | FULL NAME IN KATAKANA CHARACTERS |
| 3 | WebEdit Set | Function used to set a value in WebEdit | Browser("XYZ... | DEPARTMENT NAME SEARCH | BUSINESS DEPARTMENT / SYSTEM DEVELOPMENT DEPARTMENT / RESEARCH & DEVELOPMENT DEPARTMENT / LEGAL DEPARTMENT | — |
| 4 | WebElement Click | Function used to click on WebElement | Browser("XYZ... | . | . | . |
| 5 | WebElement Click | Function used to click on WebElement | Browser("XYZ... | . | . | . |
| 6 | Text Check | Function used to check if there is any specified character(s) in HTML | Browser("XYZ... | . | . | . |
| 7 | WebScreen Capture | Function to capture a screen | . | . | . | . |
| ... | | | | | | |

[SET A TEST CASE] [PREPARE AN INPUT DATA FILE]

FIG.17A

| ROW | FULL NAME IN KANJI CHARACTERS | FULL NAME IN KATAKANA CHARACTERS | TELEPHONE NUMBER |
|---|---|---|---|
| 1 | 山田太郎 (YAMADA TARO) | ヤマダタロウ (YAMADA TARO) | 03-XXXX-YYYY |
| 2 | 山田花子 (YAMADA HANAKO) | ヤマダハナコ (YAMADA HANAKO) | 045-AAA-BBBB |
| 3 | 田中一郎 (TANAKA ICHIRO) | タナカイチロウ (YAMADA ICHIRO) | . . . . |
| 4 | 田中一子 (TANAKA KAZUKO) | タナカカズコ (TANAKA KAZUKO) | . . . . |
| 5 | 田中次郎 (TANAKA JIRO) | タナカジロウ (TANAKA JIRO) | . . . . |
| . . . | . . . | . . . | . . . |

| ROW | LOGIN ID |
|---|---|
| . . . | . . . |
| 35 | t-yamada |
| 36 | h-yamada |
| 37 | i-tanaka |
| . . . | . . . |

230

| EXECUTION NUMBER | TEST CASE ID | GROUP ID | ROW NUMBER | OPERATION INPUT FILE | INPUT DATA FILE |
|---|---|---|---|---|---|
| 1 | REGISTRATION CASE | 1 | 1 | Login1.xls | LoginData1.xls |
| 2 | | 2 | 1 | Registration-Entered.xls | Registration-EnterData.xls |
| 3 | | 3 | — | Completed1.xls | — |
| 4 | SEARCH CASE | 1 | 35—37 | Login2.xls | LoginData2.xls |
| 5 | | 1 | 1—3 | SearchEntered.xls | SearchEnterData.xls |
| 6 | | 1 | — | Completed2.xls | — |
| ... | ... | | | ... | ... |

253 254 256 258 260 262

[EXECUTE A TEST] 264

| | LOCATION | NOVEMBER 2009 | | |
|---|---|---|---|---|
| | | 9 (MONDAY) | 10 (TUESDAY) | 11 (WEDNESDAY) |
| ☐ | First Booth at 3F North of Building A | WRITE | WRITE | WRITE |
| ☐ | First Booth at 5F West of Building B | WRITE | WRITE | WRITE |
| ☐ | Second Booth at 5F West of Building B | WRITE | WRITE | WRITE |

| | LOCATION | DECEMBER 2009 | | |
|---|---|---|---|---|
| | | 7 (MONDAY) | 8 (TUESDAY) | 9 (WEDNESDAY) |
| ☐ | First Booth at 3F North of Building A | WRITE | WRITE | WRITE |
| ☐ | First Booth at 5F West of Building B | WRITE | WRITE | WRITE |
| ☐ | Second Booth at 5F West of Building B | WRITE | WRITE | WRITE |

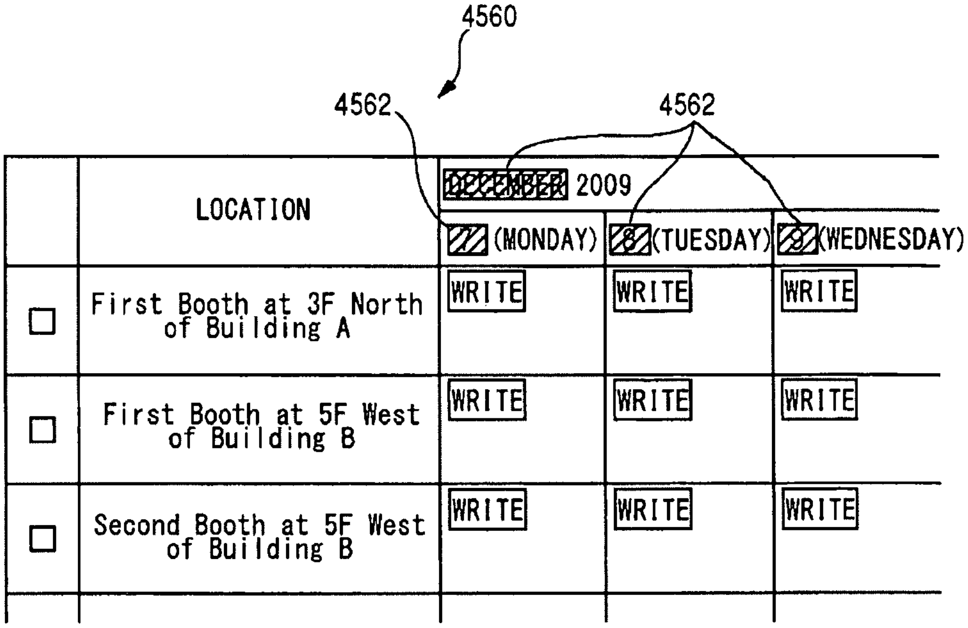

FIG.24

![Table 4560]

| | LOCATION | ▨▨ 2009 | | |
| --- | --- | --- | --- | --- |
| | | ▨(MONDAY) | ▨(TUESDAY) | ▨(WEDNESDAY) |
| ☐ | First Booth at 3F North of Building A | WRITE | WRITE | WRITE |
| ☐ | First Booth at 5F West of Building B | WRITE | WRITE | WRITE |
| ☐ | Second Booth at 5F West of Building B | WRITE | WRITE | WRITE |

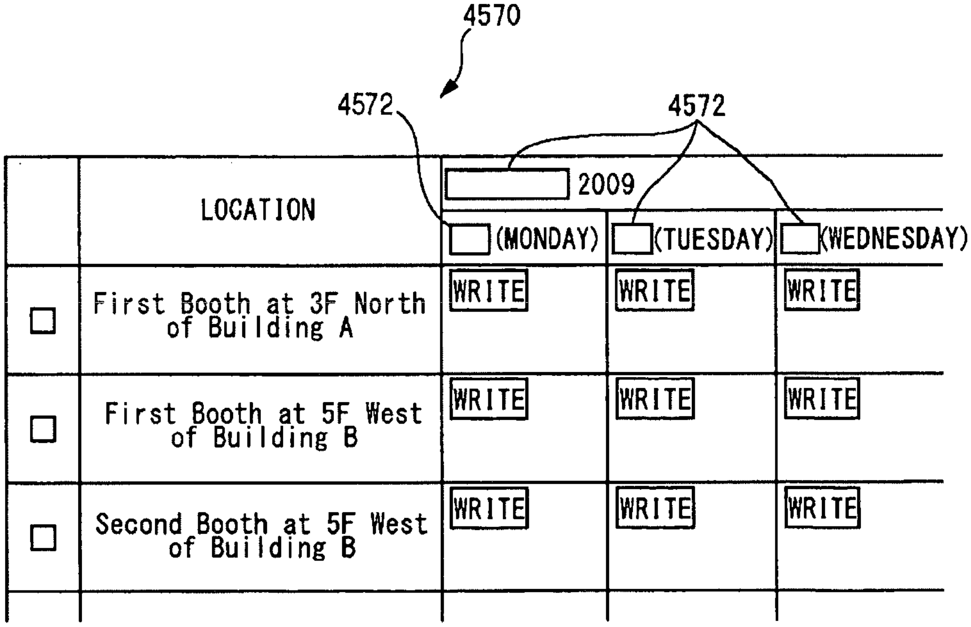

FIG.25

![Table 4570]

| | LOCATION | ☐ 2009 | | |
| --- | --- | --- | --- | --- |
| | | ☐(MONDAY) | ☐(TUESDAY) | ☐(WEDNESDAY) |
| ☐ | First Booth at 3F North of Building A | WRITE | WRITE | WRITE |
| ☐ | First Booth at 5F West of Building B | WRITE | WRITE | WRITE |
| ☐ | Second Booth at 5F West of Building B | WRITE | WRITE | WRITE |

4570, 4572, 4572

OPERATION VERIFYING APPARATUS, OPERATION VERIFYING METHOD AND OPERATION VERIFYING SYSTEM

CROSS-REFERENCE TO RELATED APPLICATIONS

This application is a continuation application of U.S. patent application Ser. No. 15/167,113, filed on May 27, 2016, now U.S. Pat. No. 10,346,288, which is a continuation application of U.S. patent application Ser. No. 13/067,009, filed on May 2, 2011, now U.S. Pat. No. 9,495,280, which is a continuation application filed under 35 U.S.C. § 111(a), of International Application PCT/JP2010/000722, filed Feb. 5, 2010, which claimed priority to Japanese Patent Application No. 2009-083198 filed Mar. 30, 2009, Japanese Patent Application No. 2010-024648 filed Feb. 5, 2010, Japanese Patent Application No. 2010-024649 filed Feb. 5, 2010, Japanese Patent Application No. 2010-024650 filed Feb. 5, 2010, Japanese Patent Application No. 2010-024651 filed Feb. 5, 2010, Japanese Patent Application No. 2010-024652 and Japanese Patent Application No. 2010-024647 filed Feb. 5, 2010 filed Feb. 5, 2010 in the Japanese Intellectual Property Office, the disclosures of which are hereby incorporated by reference.

TECHNICAL FIELD

The present invention relates to a technique used to test the operation of a product.

BACKGROUND ART

Performing an operation test on products before the delivery of the products is indispensable for guaranteeing the product quality thereof. Generally and in many occasions, test engineers manually operate on a product, and the operation test is executed by verifying the operational result. Yet, much effort is involved in manually performing the operation test on a multifunctional product having a plenty of operation variations.

Thus, the operation test is often automatically executed using a test program so as to save the overall energy spent for the operation test. For instance, an automatic functional tool called “Quick Test Professional (QTP)” provided by Hewlett-Packard (HP) Company executes a test program prepared by a user, thereby automating the operation test.

PRIOR ART DOCUMENTS

Patent Documents

[Patent Document 1] Japanese Unexamined Patent Application Publication No. 2004-227396.

DISCLOSURE OF INVENTION

Problems to be Solved by the Invention

For the operation test using the test program, however, one has to go through the trouble of preparing the test program itself. Also, the content or quality of such a test program varies depending on a person who writes the program and therefore it is difficult to support or assure the reliability of the operation test.

The present invention has been completed in view of the foregoing problems and a main purpose thereof is to provide a technique by which to efficiently execute an operation test.

Means for Solving the Problem

One embodiment of the present invention relates to an operation verifying apparatus for executing a test program to verify an operation of a predetermined device.

The operation verifying apparatus acquires a log indicating a content of a sequence of operations performed on the predetermined device, and generates the test program for reconstructing the sequence of operations in such a manner of selecting a function associated with an operation recorded in the log from among a plurality of kinds of functions into which a logic to achieve various types of operations is incorporated and in such manner of selecting an input function having an interface by which to acquire input data to be inputted to the predetermined device as to a data input operation to the predetermined device.

Then the input data to be passed to the input function is acquired, and the test program is executed by passing the acquired input data to the input function for the purpose of verifying an operation performed when the sequence of operations is executed based on the acquired input data.

Optional combinations of the aforementioned constituting elements, and implementations of the invention in the form of methods, apparatuses, systems, computer programs, recording media recording the computer programs, and so forth may also be effective as additional modes of the present invention.

Advantageous Effects

The present invention facilitates the execution of an operation test in an efficient manner.

BRIEF DESCRIPTION OF DRAWINGS

FIG. 2 shows a log entry when a dictionary test is executed.

FIG. 3 shows a program which is used to execute a dictionary test.

FIG. 7 is a screen view showing a function setting screen.

FIG. 15 is a screen view showing a function setting screen according to a second embodiment.

FIG. 16 is a screen view showing a function setting screen according to a second embodiment.

FIGS. 17A and 17B are each a screen view showing an input setting screen according to a second embodiment.

FIG. 22 shows an example of test result image data prepared by a Web page the operation of which is to be verified.

FIG. 23 shows an example of test result image data prepared by a Web page the operation of which is to be verified.

FIG. 24 shows an example of a comparison result image.

FIG. 25 shows an example of a mask image.

BEST MODE FOR CARRYING OUT THE INVENTION

First Embodiment

Figure 1A:
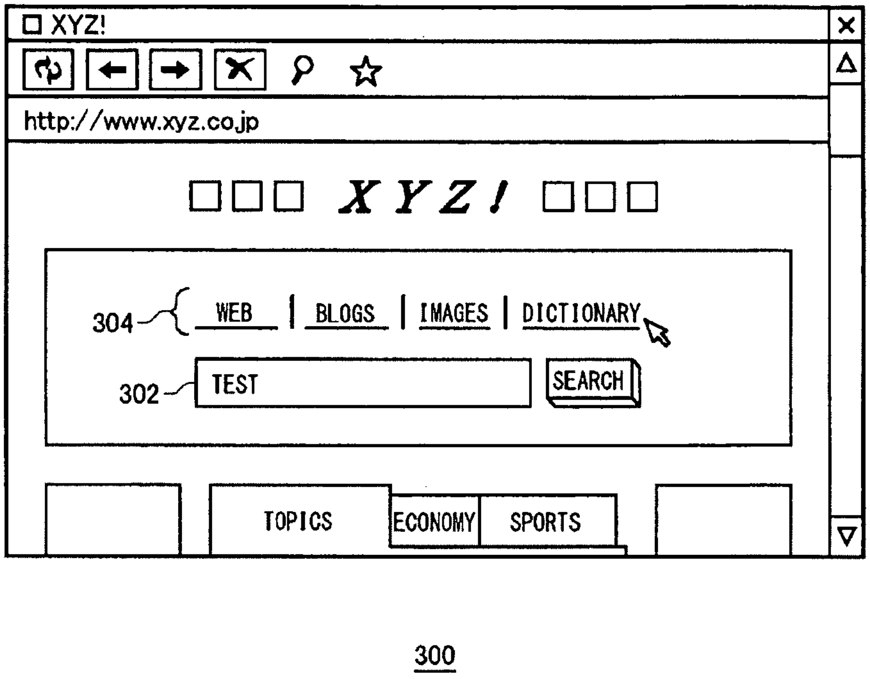
FIG. 1A is a screen view showing a first screen of a portal site.

FIG. 1A is a screen view showing a first screen 300 of a portal site.

In a first embodiment, a description is given of an operation test for a portal site "XYZ!". The first screen 300 of a portal site includes an edit box 302 and a search link 304. The search link 304 includes four links which are "Web", "Blogs", "Images" and "Dictionary". As a user enters a string of characters in the edit box 302 and mouse-clicks on any one of the search links 304, the search of the inputted character string starts. For example, if a string of characters "liquid crystal" is inputted to the edit box 302 and a "Web" link is mouse-clicked, Web sites containing the character string "liquid crystal" will be the search targets. If the string of characters "liquid crystal" is inputted to the edit box 302 and a "Blogs" link is mouse-clicked, blog pages, containing the character string "liquid crystal", among Weblogs set up in this portal site will be the search targets.

Assume herein that a character string "test" is inputted in the edit box 302 and a "Dictionary" link is mouse-clicked.

Figure 1B:
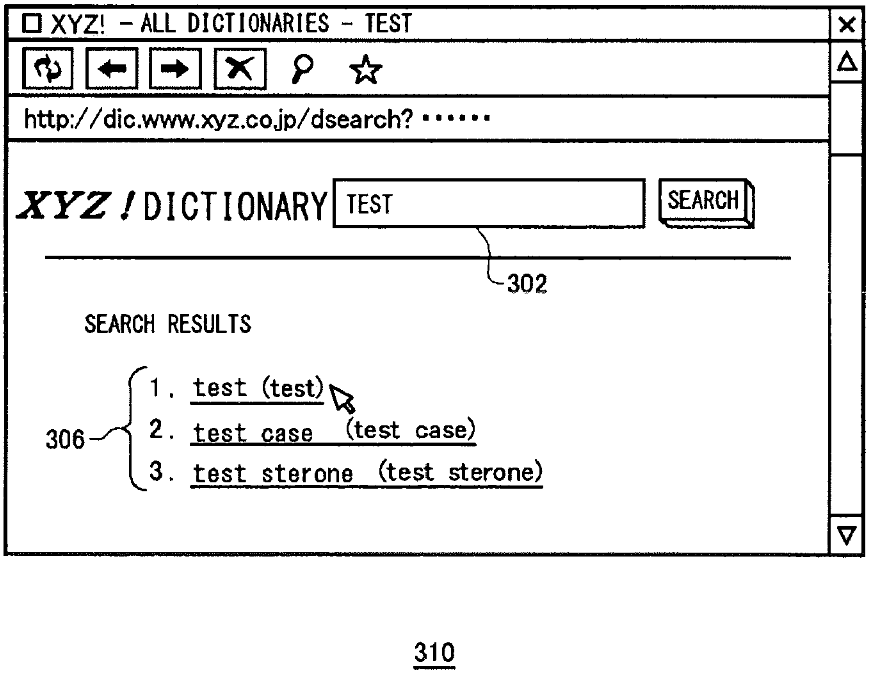
FIG. 1B is a screen view showing a second screen of a portal site.

FIG. 1B is a screen view showing a second screen 310 of a portal site.

As "test" is inputted on the first screen 300 of a portal site and "Dictionary" is mouse-clicked, the second screen 310 of a portal site as shown in FIG. 1B is displayed. In a search result space 306, items related to the character string "test" are arranged in sequence through a "dictionary" service provided by this portal site.

In this case, supposed that a "test" link listed on the top of the search result space 306 is mouse-clicked.

In the above-described process, the following three operations A1 to A3 are done.

A1. An operation in which the character string "test" is inputted to the edit box 302 of the first screen 300 of a portal site.

A2. An operation in which a "Dictionary" link in the search link 304 on the first screen 300 of a portal site is mouse-clicked.

A3. An operation in which a "test" link in the search result space 306 on the second screen 310 of a portal site is mouse-clicked. In what is to follow, an operation process achieved by the above-described operations A1 to A3 is called "dictionary test".

FIG. 2 shows an entry of a log 320 when a dictionary test is executed.

If a client terminal employing the QTP of HP company is operated and the above-described operations A1 to A3 are executed by accessing the above-described portal sites, the QTP will generate the log 320 as shown in FIG. 2. The operations A1 to A3 are recoded as code sentences of a predetermined format in the log 320.

For example, the operation A1 is expressed by a code sentence "Browser("XYZ!").Page("XYZ!").WebEdit("p") .Set"test"". This means that a character string "test" is inputted relative to the Web site at "XYZ!", the Web page named "XYZ!" and the edit box 302 named "p". Here, the edit box 302 named "p" corresponds to the edit box 302 as shown in FIG. 1A and FIG. 1B.

Similarly, the operation A2 is expressed by a code sentence "Browser("XYZ!").Page("XYZ!").Link("dictionary") .Click".

The operation A3 is expressed by a code sentence "Browser("XYZ!").Page("XYZ!-all dictionaries-test").Link ("test").Click". Though in the first embodiment a description is given based on the grammar of QTP, the format of code sentences is not limited thereto.

QTP can reproduce and execute an operation expressed by the code sentence, by interpreting the code sentence of the log 320. Accordingly, once the log 320 is generated, the dictionary test of the same content can be repeatedly executed as many times as the user wishes. Also, if a part of the log 320 is rewritten, the dictionary set can be executed under a content different from that when it is manually operated. For example, suppose that:

the character string "test" contained in "Browser("XYZ!").Page("XYZ!").WebEdit("p").Set"test"" is changed to another character string "taste" and the code sentence is now rewritten to "Browser("XYZ!").Page("XYZ!").WebEdit("p").Set-"taste"" and inputted to QTP, then the dictionary test having the same content with only the character string inputted to the edit box 302 having been altered can be automatically executed.

However, a certain degree of knowledge about the grammar of the log 320 is required if the operation test is to be executed by rewriting the log 320. Also, it is possible that human-induced mistakes are made in the course of rewriting the log 320.

FIG. 3 shows a program 330 which is used to execute the dictionary test.

Instead of executing the operation test using the log 320, a test program may be prepared by describing a content equivalent to the log 32 using a Visual Basic (VB) script or the like language. A program 330 shown in FIG. 3 is a test program prepared by referencing the log 320 of FIG. 2.

For example, the operation A1 is expressed by a VB function, which is "WebEditSet(Browser("XYZ!").Page ("XYZ!").WebEdit("p"),DataTable("p1, dtGlobalSheet")". A concrete logic of "WebEditSet" function is one as shown in the middle of FIG. 3.

The program 330 differs from the log 320 in that the program 330 does not contain input data such as the character string "test". Instead, the "WebEditSet" function receives input data from a file expressed as "dtGlobalSheet" (hereinafter referred to as "input data file"). In other words, the logic and the input data are separated from each other. The rewriting or replacement of the input data file allows the execution of the dictionary test of the identical logic on the basis of the input data. As compared with the operation test done manually and the operation test using the log 320, the operation test using the program 330 is advantageous in that it is more likely to be available in an increased number of variations.

Nevertheless, the test operation using the program 330 has the following problems d1 and d2 to be resolved.

d1. Preparation of a program itself is required additionally.

d2. The content of a program varies depending on a programmer who writes the program. For example, it is not always true that the logic of WebEditSet function prepared by a programmer P1 in association with the operation A1 is identical to the logic of WebEditSet function prepared by a programmer P2 in association with the operation A1 even though the function names are the same. Also, the program itself may contain a bug therein. Thus, efforts to assure the reliability of the program 330 itself need to be addressed. Also, though the program 330 also needs a logic, which is not directly related to the operation test, such as an exception processing, all programmers do not necessarily implement the logic in which the exception processing has been taken into consideration. In the case of a WebEditSet function shown in FIG. 3, for instance, the logic is implemented in such a manner that the WebEditSet function can handle a case where the input data is a blank character. However, a WebEditSet implemented by another program may be devoid of such consideration.

As a result, the content of an operation test and the result thereof are more susceptible to the skill of a programmer.

Figure 4:
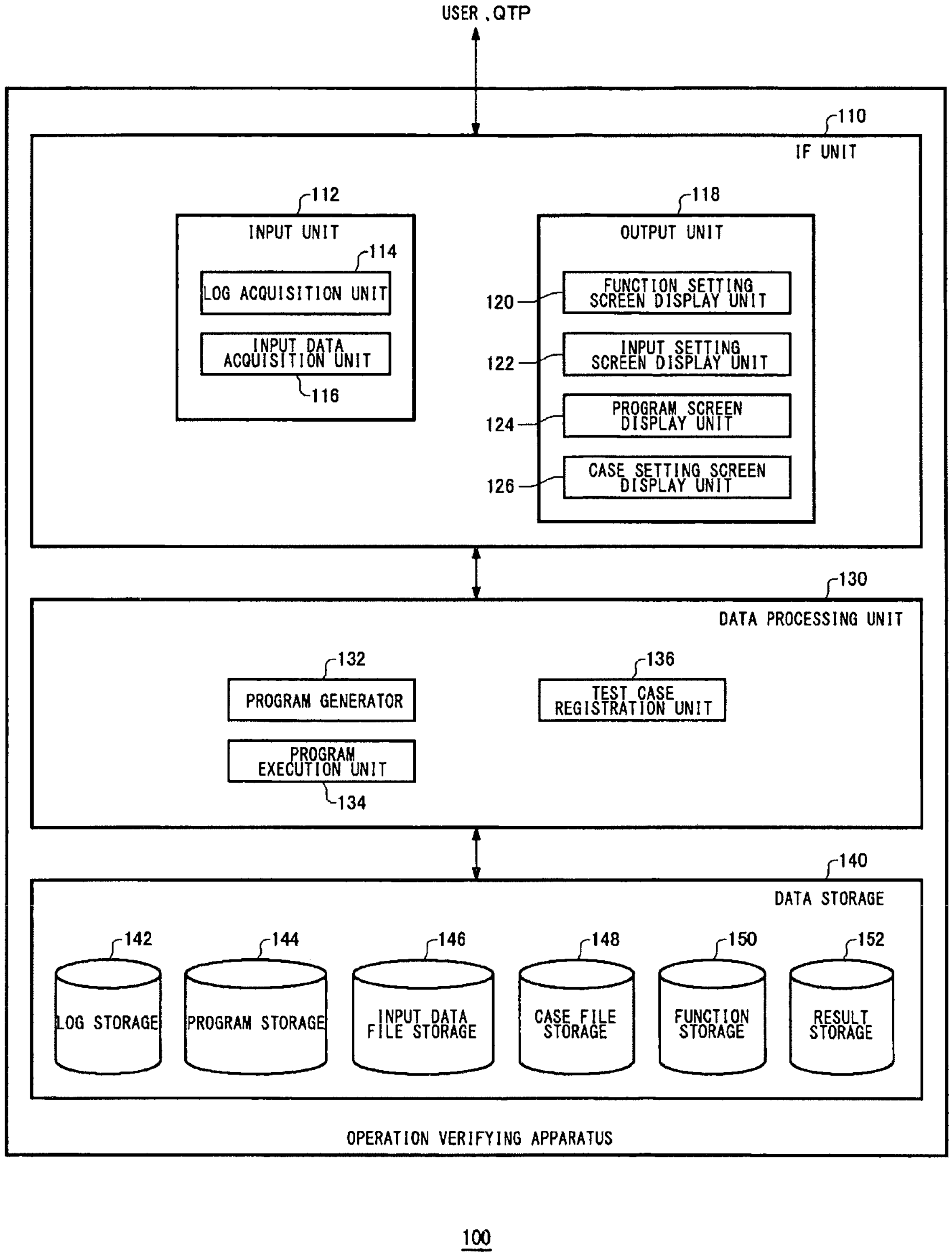
FIG. 4 is a functional block diagram of an operation verifying apparatus according to a first embodiment.

FIG. 4 is a functional block diagram of an operation verifying apparatus 100.

Each functional block shown in the block diagrams of the present patent specification may be achieved hardwarewise by elements and mechanical devices such as a CPU and the like of a computer, and softwarewise by computer programs or the like. Depicted herein are functional blocks implemented by cooperation of hardware and software. Therefore, it will be obvious to those skilled in the art that the functional blocks may be implemented by a variety of manners including hardware only, software only or a combination of both. For example, each functional block may be stored in a recording medium as a computer program, installed in a hard disk of an information processing device, and read out by memory as appropriate before it is executed by a processor.

The operation verifying apparatus 100 may be formed as an exclusive-use hardware or formed as a software module in cooperation with a user interface (e.g., Web browser).

A description is given here assuming that the operation verifying apparatus 100 according to the first embodiment is a software module formed as an ad-on of QTP.

The operation verifying apparatus 100 includes an interface (IF) unit 110, a data processing unit 130, and a data storage 140.

The IF unit takes charge of performing an interface between the user and QTP, for instance. The data processing unit 130 executes various kinds of data processings based on the data acquired from the IF unit 110 and the data storage 140. The data processing unit 130 also plays a role of an interface between the IF unit 110 and the data storage 140. The data storage 140 is a storage area for storing various types of data.

IF unit 110:

The IF unit 110 includes an input unit 112 and an output unit 118. The input unit 112 takes charge of processing inputs from the user and QTP, and the output unit 118 takes charge of processing outputs to the user and QTP. The input unit 112 includes a log acquisition unit 114 and an input data acquisition unit 116. The log acquisition unit 114 acquires a log from QTP. The input data acquisition unit 116 acquires an input data file and obtains, from the input data file, input data to be supplied to a program. A detailed description of the input data file will be given in conjunction with FIG. 5 and FIG. 9.

Figure 8:
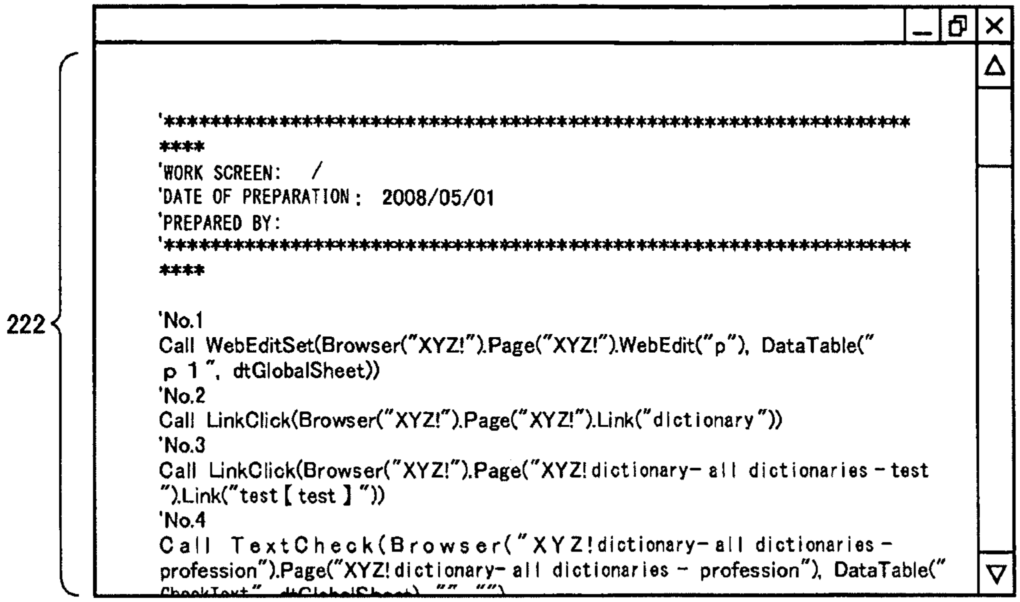
FIG. 8 is a screen view showing a program screen.
Figure 9:
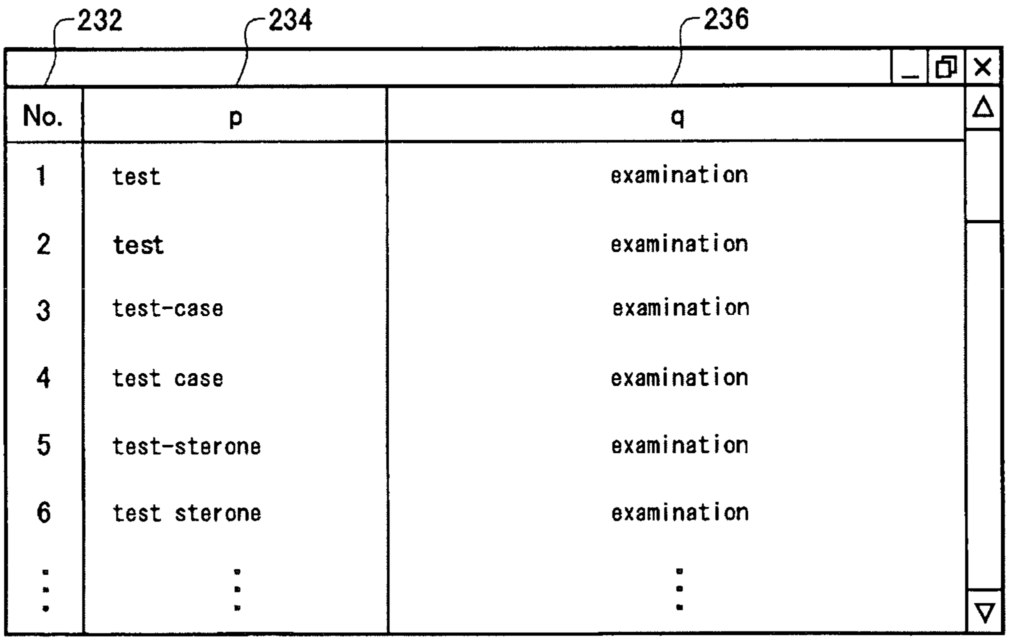
FIG. 9 is a screen view showing an input setting screen.
Figure 10:
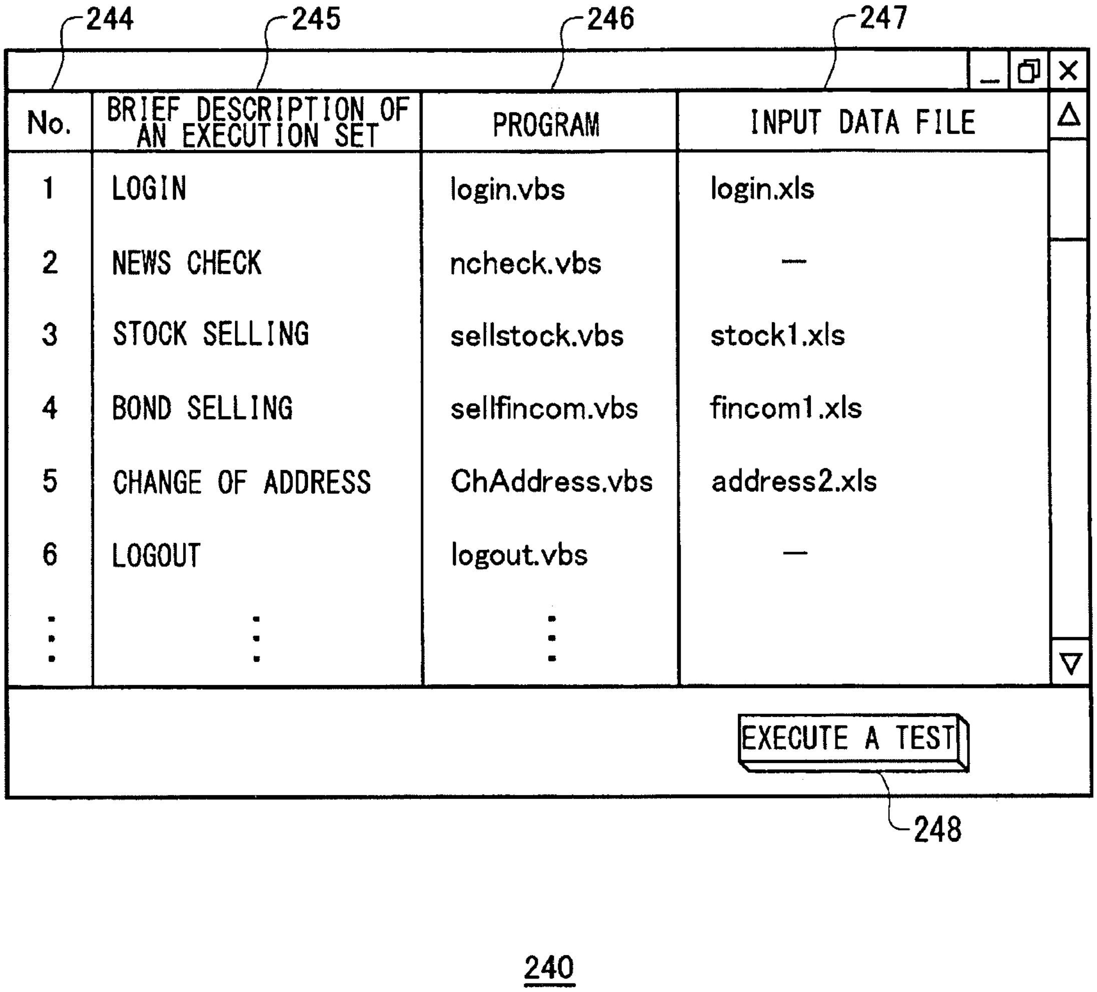
FIG. 10 is screen view showing a case setting screen.

The output unit 118 includes a function setting screen display unit 120, an input setting screen display unit 122, a program screen display unit 124, and a case setting screen display unit 126. The function setting screen display unit 120 displays a function setting screen 210 as shown in FIG. 7. The input setting screen display unit 122 displays an input setting screen 230 as shown in FIG. 9. The program screen display unit 124 displays a program screen 220 as shown in FIG. 8. The case setting screen display unit 126 displays a case setting screen 240 as shown in FIG. 10.

Data processing unit 130:

The data processing unit 130 includes a program generator 132, a program execution unit 134, and a test case registration unit 136. The program generator 132 automatically generates a program for the operation test. The program execution unit 134 executes the thus generated program. In the first embodiment, QTP runs the program. The test case registration unit 136 registers an execution set in a case file. A detailed description of the execution set and the execution file will be given in conjunction with FIG. 10.

Data storage 140:

The data storage 140 includes a log storage 142, a program storage 144, an input data file storage 146, a case file storage 148, a function storage 150, and result storage 152 (hereinafter referred to as "test result storage 152" also). The log storage 142 stores logs. The program storage 144 stores programs. The input data file storage 146 stores input data files. The case file storage 148 stores case files. The function storage 150 stores a function library about functions registered in the program for the operation test. The result storage 152 stores the results of operation tests.

Figure 5:
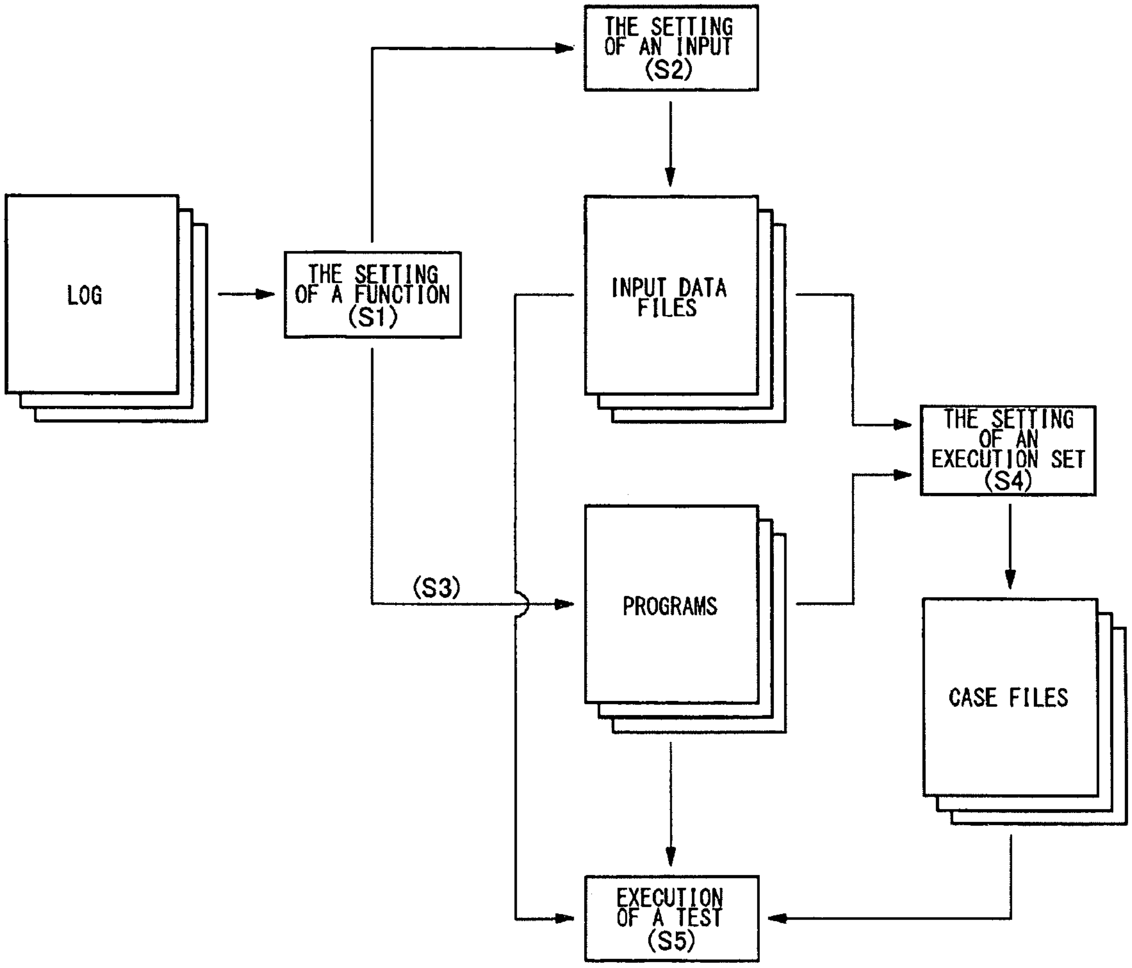
FIG. 5 briefly shows a process from the acquisition of a log to the execution of an operation test.

FIG. 5 briefly shows a process, in the first embodiment, from the acquisition of a log to the execution of an operation test.

A device on which an operation test is to be performed is manually operated first. In the first embodiment, the portal site "XYZ!" is accessed by operating on a Web browser of a client terminal. QTP generates a log, and the log acquisition unit 114 obtains the log from the QTP. A function is associated beforehand with each type of code sentence. The function setting screen display unit 120 reads out a function library from the function storage 150 and thereby displays a list of functions associated with the respective code sentences contained in the log (S1). The user can, as appropriate, add, change or delete any of the functions on the function setting screen display unit 120. In this manner, the functions to be included in the program are identified. A detailed description of Step S1 is given in conjunction with FIG. 7.

Then, input data to be supplied to this program are set (S2). A setting content is registered as the input data file. A program is automatically generated from a group of functions set in Step S1 (S3). A detailed description of Step S3 is given in conjunction with FIG. 8.

Then, a combination of a program and an input data file is registered as the "execution set" from a plurality of kinds of programs and a plurality of kinds of input data files. A plurality of execution sets may be registered (S4). The setting content is registered as a case file. For example, if a program P1 is executed based on an input data file F2 and, thereafter, a program P2 is to be executed based on an input data file F6, the setting content will be registered as a first execution set and a second execution set in the case file. Here, the first execution set is a combination of the program P1 and the input data file F2, and the second execution set is a combination of the program P2 and the input data file F6. A detailed description of Step S4 is given in conjunction with FIG. 10.

Finally, the program is executed according to the case file (S5). In the above-described example, the program execution unit 134 executes the first execution set and the second execution set in a continued manner. The program execution unit 134 registers the execution result, namely the test result, in the result storage 152.

Figure 6:
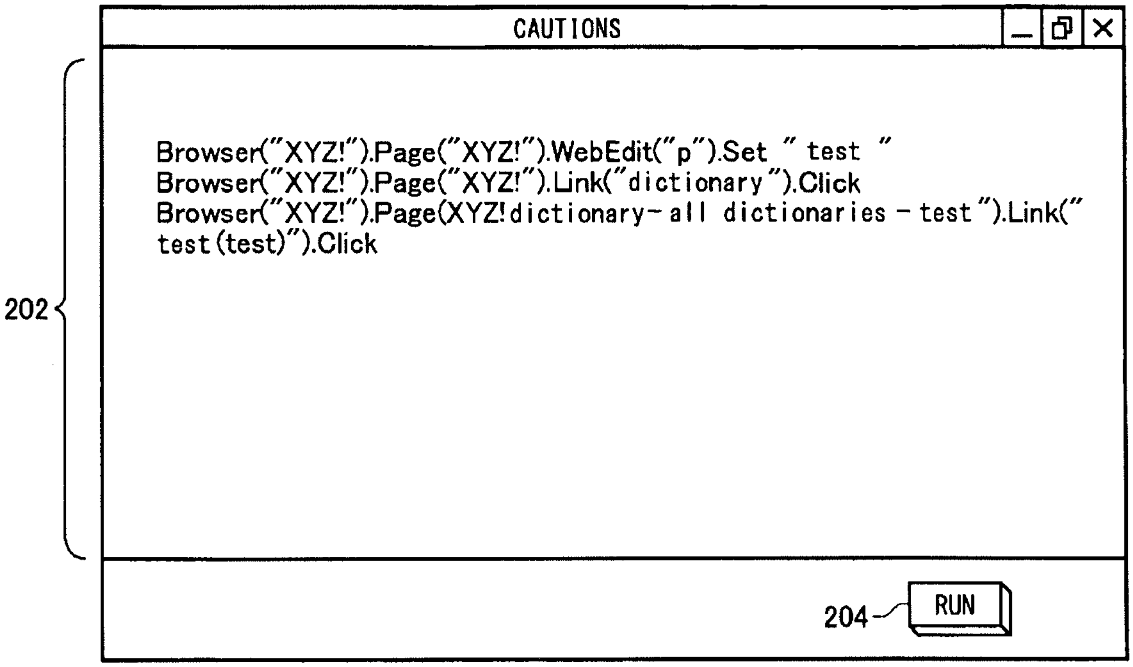
FIG. 6 is a screen view showing a log screen.

FIG. 6 is a screen view showing a log screen 200. As the log acquisition unit 114 acquires a log, the output unit 118 displays the log on a log display area 202 of the log screen 200. The user may copy and paste the log of QTP into the log display area 202. Or the output unit 118 may acquire a log (file) generated by QTP while the log screen 200 is being displayed, and may display the thus acquired log in the log display area 202. When the user mouse-clicks on an execution button 204, the function setting screen 210 shown next in FIG. 7 is displayed.

FIG. 7 is a screen view showing a function setting screen.

The program generator 132 identifies functions related to code sentences contained in a log, and displays a list of the identified functions in a function column 214 of the function setting screen 210. A number column 212 indicates the execution sequence. A description column 216 indicates the description of each function. An object column 218 indicates an object to be operated. A parameter column 219 indicates the name of parameter. An input value column 217 indicates input data.

In the function library, the "WebEditSet" function is associated beforehand with the above-described code sentence, indicating the operation A1, which is as follows: "Browser("XYZ!").Page("XYZ!").WebEdit("p").Set"test"

As the program generator 132 reads out a first code sentence of the log 320, the program generator 132 references the function library in the function storage 150 and identifies the "WebEditSet" function. The object to be operated by the operation A1 is a page of "Browser("XYZ!").Page("XYZ!")". Thus, "Browser("XYZ!").Page ("XYZ!")" is set in the object column 218. The "WebEditSet" function is a function where the input data set in the edit box "p" (edit box 302) is an argument. Although input data which is to be set in the edit box "p" may be set in the input value column 217, a description is given hereunder assuming that the input data is not registered in the function setting screen 210. The input data is set in the input setting screen 230 described in detail in conjunction with FIG. 9.

Since the log 320 contains three code sentences corresponding to the operations S1 to A3, the program generator 132 identifies three functions. The user may add, delete or change the function on the function setting screen 210. A fourth function "TextCheck" and a fifth function "WebScreenCapture" are functions added and selected by the user.

The "TextCheck" function is a function by which to determine whether a character string to be substituted into a variable "q" is contained in a currently displayed Web page. The "WebScreenCapture" function is a function used to capture the currently displayed Web page on a screen. The "WebScreenCapture" function is a convenient function in managing the trails of operation test results. In this manner, not only the functions, complying with a user operation, such as the "Web ScreenCapture" function but also a function, used to assist and support the operation test, such as the "TextCheck" function is prepared. The user can set a logic which he/she wishes to add to the operation test, by merely selecting a desired function from the function library.

As a test case setting button 215 is clicked, a case setting screen 240 of FIG. 10 is displayed. As an input data file preparation button 213 is clicked, an input setting screen 230 of FIG. 9 is displayed. As a program preparation button 211 is clicked, a program screen 220 of FIG. 8 is displayed.

The operation verifying apparatus 100 according to the first embodiment has the following merits m1 and m2.

m1. A logic that the user wishes to be included in the program can be selected by merely selecting a function through the operation on a graphical user interface (GUI). Thus, the preparation for the program takes almost no trouble.

m2. The functions included in the program are those which have already been registered in the function library and therefore the quality of the program is less likely to vary depending on a person who writes the program. Required logics such as the exception processing are also incorporated beforehand into each function.

FIG. 8 is a screen view showing the program screen 220.

When the program preparation button 211 is mouse-clicked in the function setting screen 210, the program generator 132 generates a program and then the program screen display unit 124 displays the source code of the thus generated program on a program display area 22 of the program screen 220. The program is stored in the program storage 144.

FIG. 9 is a screen view showing the input setting screen 230.

When the input data file preparation button 213 is mouse-clicked in the function setting function screen 210, the input setting screen display unit 122 displays the input setting screen 230. In the function setting screen 210, parameters "p" and "q" are defined. A number column 232 indicates the input sequence. A variable column 234 indicates input data to the parameter "p", whereas a variable column 236 indicates input data to the parameter "q". In the input setting screen 230, input data which are substituted into the parameters "p" and "q" are set. Each of the input data is stored as an input data file in the input data file storage 146.

For example, as the input data file shown in FIG. 9 is supplied to the program 330, a plurality of dictionary tests, such as the following Tests 1 to 3, based on different input data can be conducted continuously.

Test 1. A character string "Test" is inputted to the edit box 302 and a dictionary is searched; it is determined whether a string character "examination" is contained in a screen displaying the execution result or not.

Test 2. A character string "test" is inputted to the edit box 302 and the dictionary is searched; it is determined whether or not the string character "examination" is contained in the screen displaying the execution result or not.

Test 3. A character string "test-case" is inputted to the edit box 302 and the dictionary is searched; it is determined whether the character string "examination" is contained in the screen displaying the execution result or not.

FIG. 10 is screen view showing the case setting screen 240.

As the test case setting button 215 is mouse-clicked in the function setting screen 210, the case setting screen display unit 126 displays the case setting screen 240. A number column 244 indicates the execution sequence. An execution set column 245 indicates a brief description of each execution set. A program column 246 indicates a program to be executed. An input data file column 247 indicates an input data file from which input data is to be extracted.

A description is given hereinbelow assuming that the operation test is performed on a Web site of an Internet securities broker.

In FIG. 10, registered are six execution sets 1 to 6, namely, 1. Login, 2. News check, 3. Stock setting, 4. Bond selling, 5. Change of address, and 6. Logout. First, QTP generates a "login" project from a program called "login.vbs". The "project" meant here is a directory including a group of files each having a QTP execution format. With the "login" project as an input, QTP executes processes defined in "login.vbs" and "login.xls". As the user mouse-clicks on an execution button 248, the "login" project of the execution set "Login" is first executed. As the first execution set "Login" is completed, a "ncheck" project is executed as the execution set "Newscheck".

In this manner, the six execution sets which are 1. Login, 2. News check, 3. Stock setting, 4. Bond selling, 5. Change of address, and 6. Logout are executed successively when the execution button 248 is mouse-clicked. As a result, an operation test based on a test scenario "after a login and a check of news, the selling of part of shareholding and the selling of bond in portfolio are instructed and the address is changed and then logout is performed" can be automated.

The user can freely create the test scenario on the case setting screen 240. For example, an execution set "Stock buying" may be registered instead of the execution set "Stock selling". For example, not "stock1.xls" but another input data file may be registered as the input data file of the execution set "Stock selling". The test scenario registered through the case setting screen 240 is recorded as a case file and stored in the case file storage 148.

Varying or modifying the structure of a test scenario, the input data file and the like facilitates wider variations of a given operation test.

A description has been given of the operation verifying apparatus 100 according to the first embodiment.

By employing the operation verifying apparatus 100, the program and the input data, namely the processing and the parameters, can be separated from each other. And a program therefor can be automatically generated based on the settings made via the GUI. Thereby, programs of stabilized quality can be easily generated while the diversity of logics included in each program is assured. Also, only changing the content of an input data file allows changing the content of the operation test, thereby making it easy to broaden the variation of the operation test.

Further, the execution sets are registered in the case file and the test scenario is created using them, so that the operation tests suitable to various situations can be achieved by combining the existing programs. Also, prepared are not only functions, used to operate a device to be tested, such as the "WebEditSet" function but also functions, used to support the operation tests, such as the "Web ScreenCapture" function. Thus, the efficiency and reliability are more likely to be improved.

Up to this point, the present invention has been described in conjunction with the first embodiment thereof. The embodiments in this patent specification are given solely by way of illustration. It will be understood by those skilled in the art that various modifications may be made to the combinations of the components and processes thereof, and all such modifications are also intended to fall within the scope of the present invention. Some examples of such modifications are described below.

In the first embodiment, the operation verifying apparatus 100 prepares a program on the condition that QTP has received a user's operation and has generated the log.

As a modification, the program may be generated when the Web browser has acquired an HTML file. In this case, the operation verifying apparatus 100 searches for a form tag included in the HTML file and identifies what kind of input interface is included in the HTML file. Then, a function with which to input data to each input interface is selected, and those functions are arranged in various orders; as a result, a program for the test can be generated without an explicit Web operation by the user.

Second Embodiment

Similar to the first embodiment, problems to be resolved by a second embodiment are that (1) the user has to go through the trouble of preparing the test program when the operation test is performed using the test program, and that (2) the content or quality of such a test program varies depending on a person who writes the program and therefore it is difficult to support or assure the reliability of the operation test. A main purpose of the second embodiment is to provide a technique by which to efficiently execute the operation test, too.

In order to resolve the above problems, an operation verifying apparatus according to the second embodiment executes a test program to verify an operation of a predetermined device, and it includes (i) an operation recording unit configured to detect a data input operation performed on the predetermined device and configured to record a function, which corresponds to the data input operation and which is provided with an interface used to acquire input data inputted to the predetermined device, in an operation input file that records a function to be set in the test program, (ii) a program generator configured to generate the test program for reconstructing the sequence of operations, performed on the predetermined device, by setting a program code according to the function recorded in the operation input file, and (iii) a program execution unit configured to execute the test program in such a manner that the input data is acquired from an input data file differing from the operation input file and is passed to the function. A detailed description thereof is given hereunder.

Proposed in the second embodiment is an operation verifying apparatus 100 which is modified over the above-described first embodiment.

A brief description is given of the operation verifying apparatus 100 according to the second embodiment by first comparing the operation verifying apparatus 100 according to the first embodiment with the operation verifying apparatus 100 according to the second embodiment.

Figure 11A:
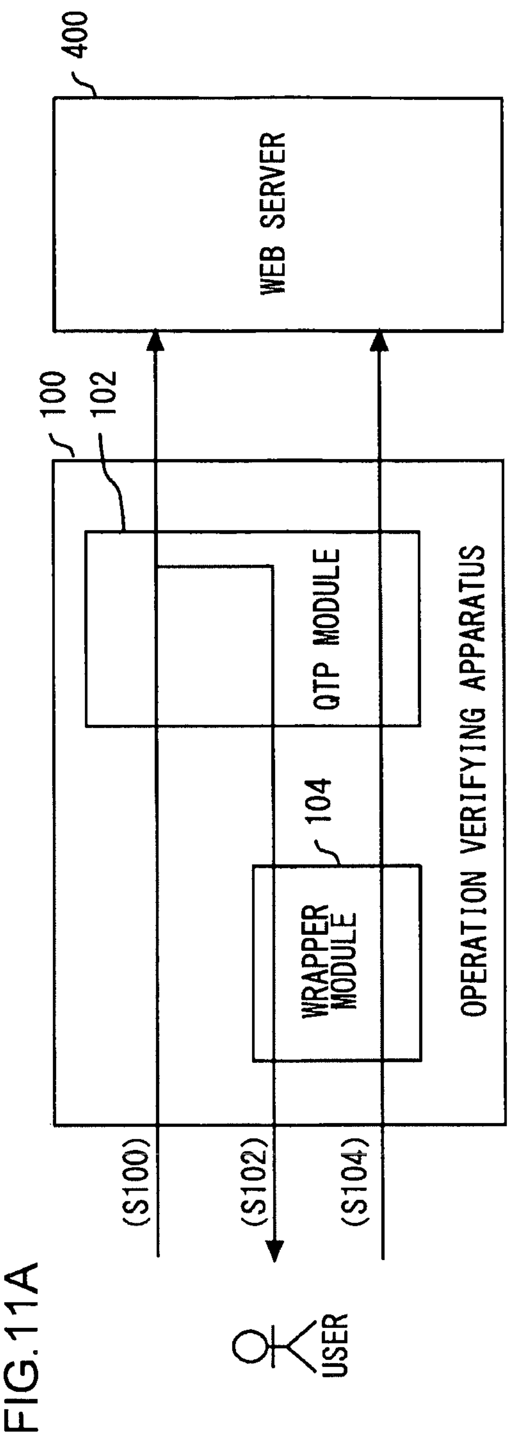
FIGS. 11A and 11B show brief structures of an operation verifying apparatus according to a first embodiment and an operation verifying apparatus according to a second embodiment, respectively.
Figure 11B:
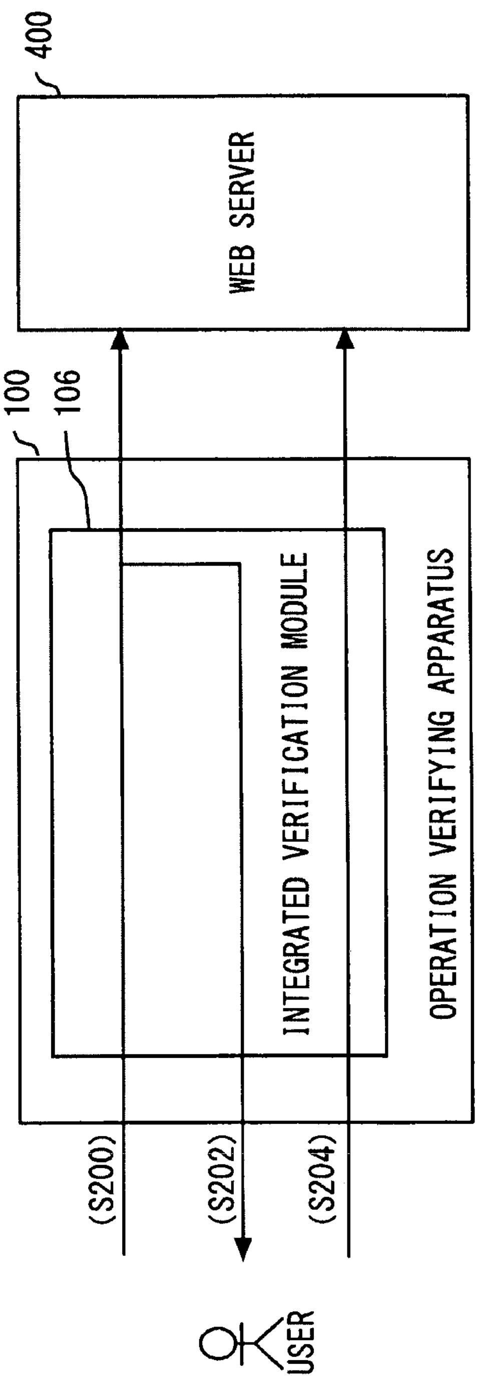

FIGS. 11A and 11B show brief structures of the operation verifying apparatus 100 according to the first embodiment and the operation verifying apparatus 100 according to the second embodiment, respectively. As shown in FIG. 11A, the operation verifying apparatus 100 according to the first embodiment 100 includes a QTP module 102, which is an execution engine for an operation test, and a wrapper module 104 for efficiently performing the operation test of a Web server 400 using the QTP module 102. The wrapper module 104 includes each functional block as shown in FIG. 4.

Referring to FIG. 11A, the user operates on the Web server 400, the operation of which is to be verified, via the QTP module 102 (S100). The wrapper module 104 acquires a log, which has recorded its operation input, from the QTP module 102 and presents the function setting screen 210 to the user (S102). At the time the operation test is executed, the user has the wrapper module 104 generate an operation testing program which the QTP module can load, and has the QTP module.

In contrast thereto, as shown in FIG. 11B, the operation verifying apparatus 100 according to the second embodiment includes an integrated verification module 106 in which the function of the execution engine for an operation test and the function of the wrapper module 104 are integrated into a single unit. As the user operates on the Web server 40 via the integrated verification module 106 (S200), the integrated verification module 106 sequentially detects its operation inputs and sets data of the function setting screen 210 so as to present the function setting screen 210 to the user (S202). At the time the operation test is executed, the user has the integrated verification module 106 generate an operation testing program and has it execute the program (S204).

Figure 12A:
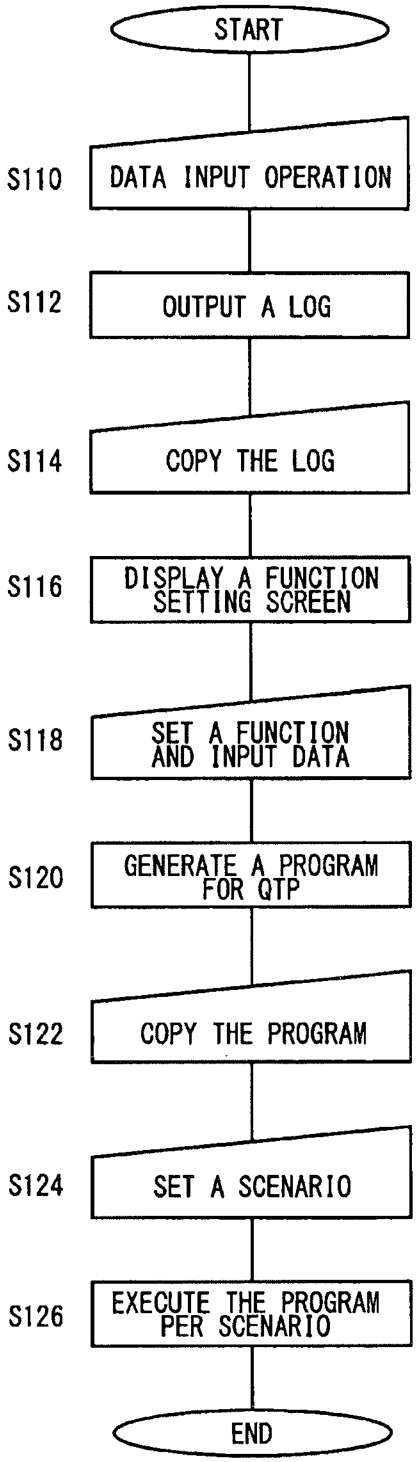
FIGS. 12A and 12B show brief operations of an operation verifying apparatus according to a first embodiment and an operation verifying apparatus according to a second embodiment, respectively.
Figure 12B:
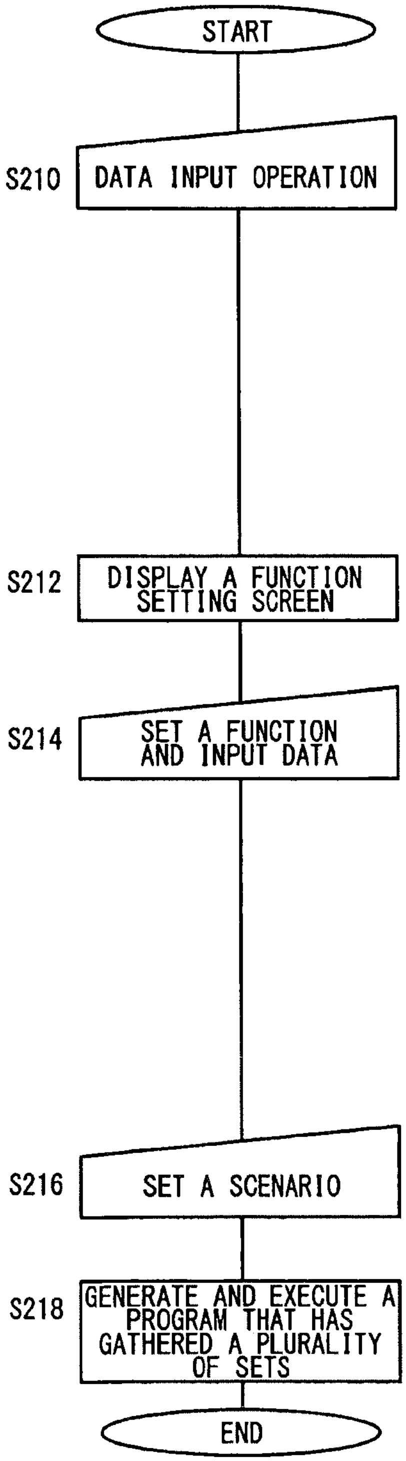

FIGS. 12A and 12B show brief operations of the operation verifying apparatus 100 according to the first embodiment and the operation verifying apparatus 100 according to the second embodiment, respectively. The user performs a data input operation on the Web server 400 (S110), and the QTP module 102 outputs the log that has recorded its operation input (S112). The user copies the data of the log to a predetermined area of the QTP module 102 (S114). The wrapper module 104 sets and displays the function setting screen, based on the data of the log set in the predetermined area thereof (S116). The user sets, via the function setting screen, a function and input data to be added or changed (S118).

The wrapper module 104 generates a QTP program for the operation test, based on the data of the function setting screen (S120). The user copies the QTP program to the predetermined input area of QTP module 102 (S122). The user sets a scenario of an operation test, in which the QTP program and the input data file are specified as a set, on the case setting screen (S124). Based on the scenario thereof, the wrapper module 104 passes the set of the QTP program and the input data file to the QTP module 102 so as to execute the operation test for each set (S126).

FIG. 12B shows a brief operation of the operation verifying apparatus 100 according to the second embodiment. The user performs a data input operation on the Web server 400 (S210). The integrated verification module 106 sequentially detects the data input operations, records functions associated with the respective data input operations in the operation input file, and displays the recorded data of the operation input file on the function setting screen (S212). The user sets a function and input data to be added or changed, in the operation input file via the function setting screen (S214). Then the user sets the scenario of an operation test, in which the QTP program and the input data file are specified as a set, on the case setting screen (S216). Based on the scenario thereof, the integrated verification module 106 generates and executes an operation testing program in which one or more sets in the scenario are gathered and aggregated (S218).

As described above, the QTP module 102 and the wrapper module 104 are each a separate and independent unit in the operation verifying apparatus 100. Thus, the user himself/herself needs to carry out a mediation work between them in order that one module can function in cooperation with the other module and vice versa. Also, the wrapper module 104 needs to call the QTP module 102 for each set in the scenario and execute the testing program for each set.

In contrast thereto, the operation verifying apparatus 100 according to the second embodiment is structured such that the execution engine for an operation test and the wrapper module 104 achieving the efficient use of the execution engine are seamlessly integrated without them being separated from each other. Thus, as compared with the operation verifying apparatus 100 according to the first embodiment, the work that should otherwise be done by the user to coordinate the separate modules is eliminated, so that the workload of the user to carry out the operation test can be reduced. Also, the operation testing program in which a plurality of sets in the scenario are aggregated is generated. Thus, a sequence of scenarios is executed by the execution of said program, thereby achieving a fast operation test.

Figure 13:
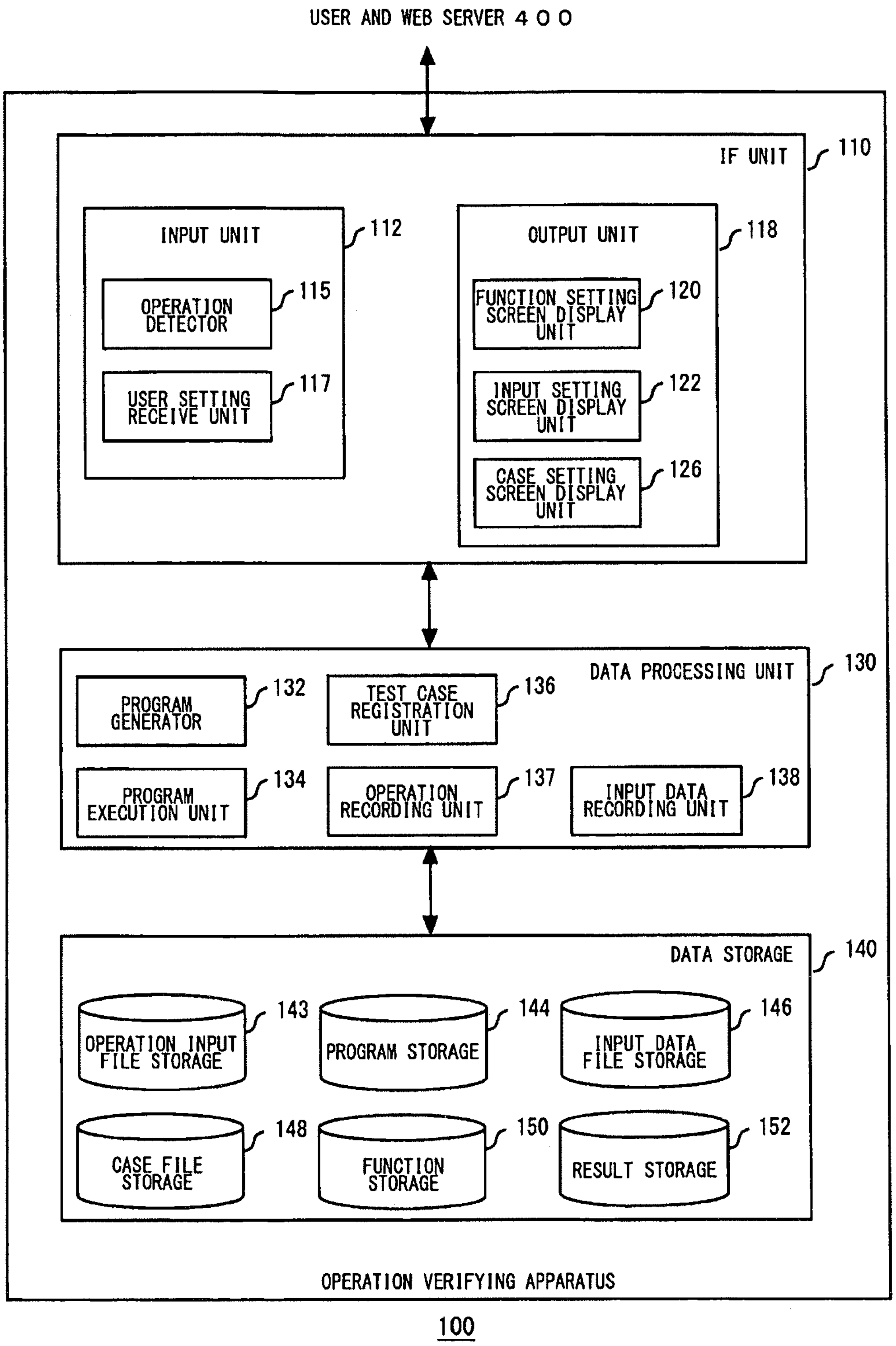
FIG. 13 is a block diagram showing a functional configuration of an operation verifying apparatus according to a second embodiment.

FIG. 13 is a block diagram showing a functional configuration of the operation verifying apparatus 100 according to the second embodiment. The functional blocks shown in FIG. 13 are included in the integrated verification module 106 shown in FIG. 11 B. The functional blocks in the second embodiment corresponding to those in the first embodiment are given the same reference numerals. For the functional blocks which are given the same reference numerals as those in the first embodiment, a description thereof will be given hereinbelow if the function thereof differs from that already described in the first embodiment and will be omitted if it is the same.

The data storage 140 includes an operation input file storage 143, a program storage 144, an input data file storage 146, a case file storage 148, and a function storage 150. The operation input file storage 143 stores an operation input file that records functions to be set in the operation testing program. The program storage 144 stores operation testing programs generated according to the operation input file.

An input unit 112 in an IF unit 110 includes an operation detector 115 and a user setting receive unit 117. The operation detector 115 sequentially detects data input operations operated on a Web server 400 by the user. The user setting receive unit 117 detects user's setting information about a function setting screen 210, an input setting screen 230 and a case setting screen 240.

An output unit 118 in the IF unit 110 includes a function setting screen display unit 120, an input setting screen display unit 122, and a case setting screen display unit 126. The function setting screen display unit 120 instructs a predetermined display unit to display the function setting screen 210 that displays the content of the operation input file recorded in the operation input file storage 143.

A data processing unit 130 includes a program generator 132, a program execution unit 134, a test case registration unit 136, an operation recording unit 137, and an input data recording unit 138. The operation recording unit 137 identifies a function, associated with the data input operation detected by the operation detector 115, by referencing the function storage 150, and records the thus identified function in the operation input file. Also, the operation recording unit 137 records the user's setting information about the function setting screen 210, in the operation input file. The input data recording unit 138 records, via the input setting screen 230, the input data inputted by the user in the input data file. The program generator 132 generates an operation testing program according to the function recorded in the operation input file. The program execution unit 134 executes the thus generated operation testing program as an execution engine for the operation test, and records the result thereof in the result storage 152.

Figure 14:
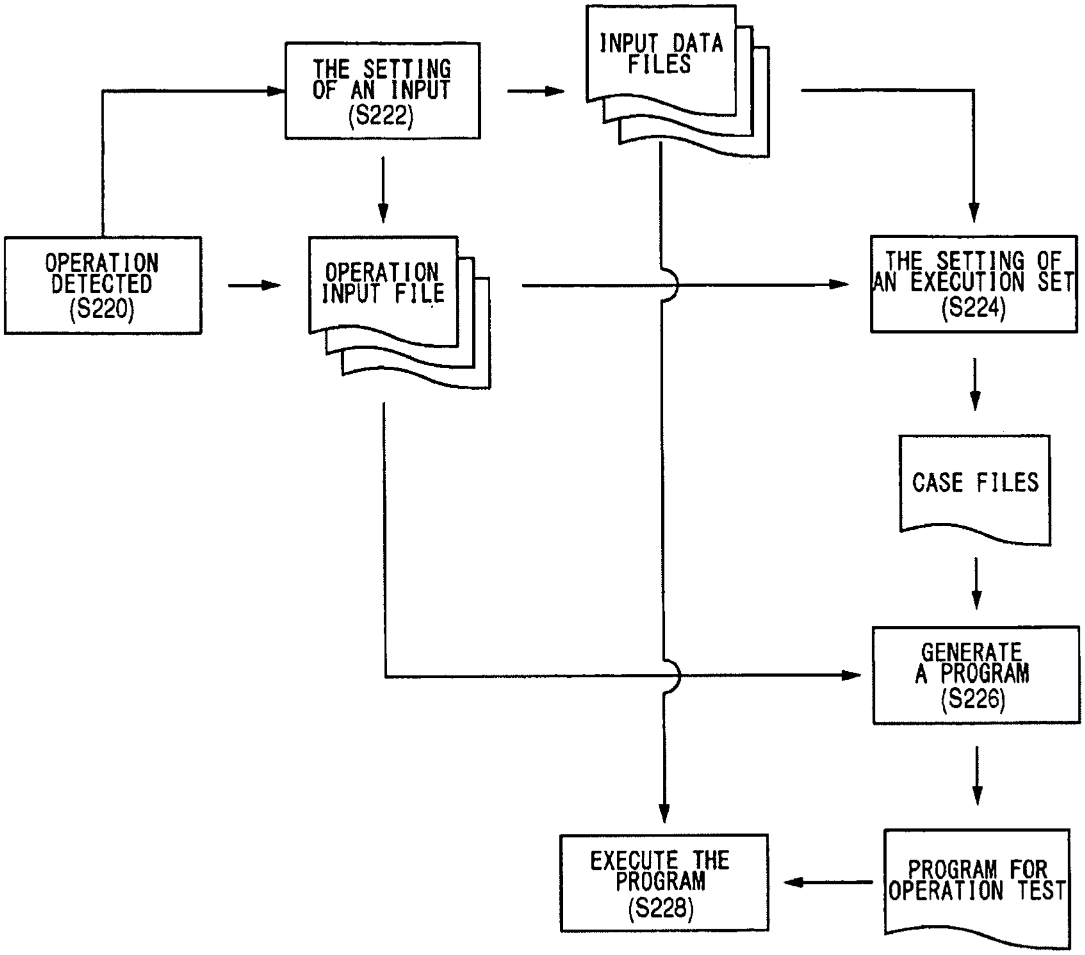
FIG. 14 briefly shows a process, in a second embodiment, from the detection of a user's data input operation to the execution of an operation test.

FIG. 14 briefly shows a process, in the second embodiment, from the detection of a user's data input operation to the execution of an operation test. The user first accesses the Web server 400 by operating on the Web browser of a client terminal, and executes various kinds of operations, typically a data input operation, on a Web page provided by the Web server 400. The operation detector 115 sequentially detects the user's data input operations, and the operation recording unit 137 reads out a function library from the function storage 150 and sequentially records the functions associated with the respective data input operations in the operation input file (S220).

Then, the function setting screen display unit 120 reads out the operation input file of the operation input file storage 143, and displays a function setting screen that displays a list of functions corresponding to the user's operations. The user can, as appropriate, add, change or delete any of the functions on the function setting screen. Also, the user can set input data to be set statically, in the operation testing program. In this manner, the functions to be included in the operation testing program are identified. A description of the function setting screen is given in conjunction with FIG. 15 and FIG. 16.

Then, the input setting screen display unit 122 displays the input setting screen 230. The user sets, via the input setting screen 230, input data to be dynamically supplied to the operation testing program at the time of executing the operation test. The input data set by the user is recorded in the input data file (S222). A description of the input setting screen 230 is given in conjunction with FIG. 17.

Then, the case setting screen display unit 126 displays the case setting screen 240. The user registers a combination of an operation input file and an input data file selected from a plurality of kinds of operation input files and a plurality of kinds of input data files, as an execution set. The test case registration unit 136 registers one or more execution sets in the case file (S224). For example, if in a first test case the setting content of an operation input file F01 is executed based on an input data file F12 and then the setting content of an operation input file F02 is executed based on the setting content of an input data file F16, they will be registered as:

(First Test Case)

Execution set 1: (Operation input file F01)+(Input data file F12), and

Execution set 2: (Operation input file F02)+(Input data file F16).

Figure 18:
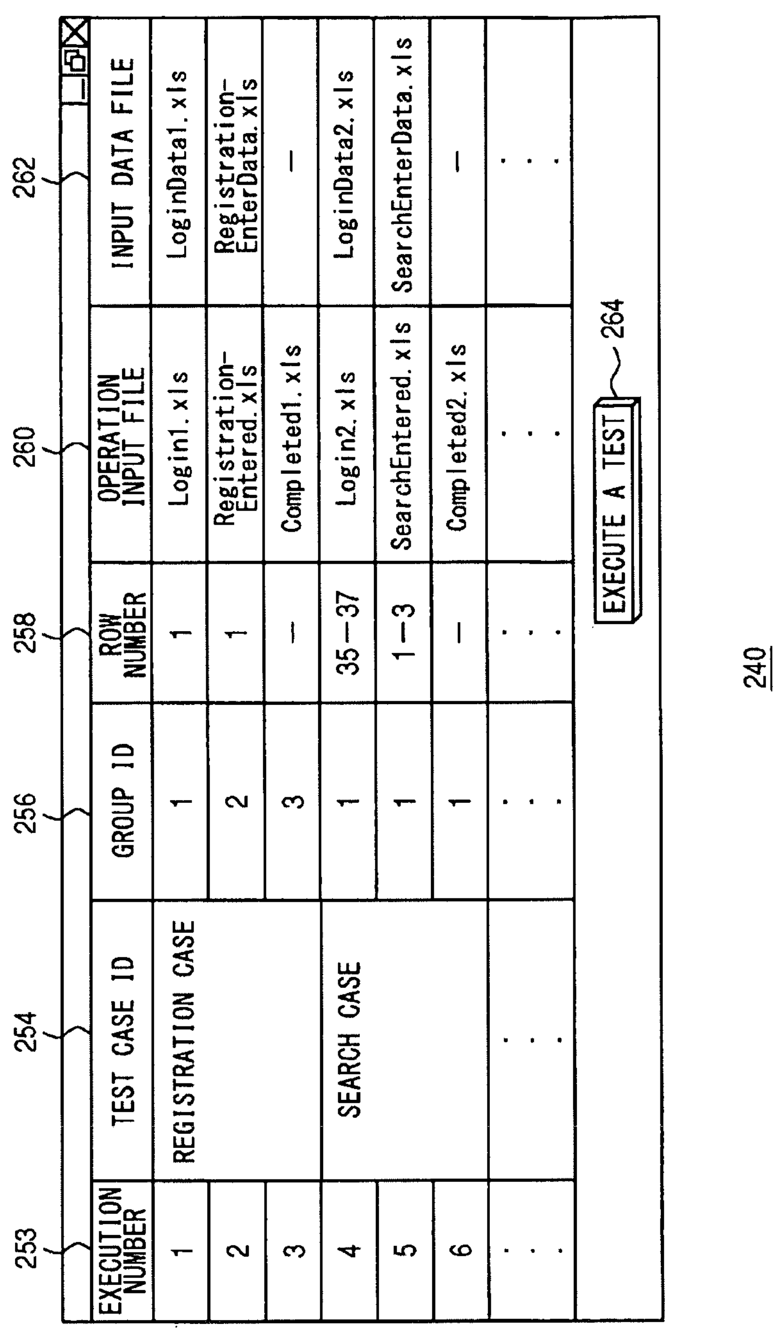
FIG. 18 is a screen view showing a case setting screen according to a second embodiment.

A description of the case setting screen 240 is given in conjunction with FIG. 18.

Next, the program generator 132 generates an operation testing program based on the case file and the operation input file (S226). More specifically, the functions sequentially recorded in the operation input file set in execution set may be sequentially set in program codes of the operation testing program. Also, if a plurality of execution sets are set in a single test case, the program generator 132 will gather the functions recorded in the operation input file of each execution set into a single operation testing program and set it.

Also, if the input data itself is set for a function of the operation input file, the program generator 132 will set the input data statically in the operation testing program. For example, when the operation testing program is to be generated, the input data is set beforehand as an argument of the function in the program code. Also, where an input data file is specified for the function in the operation input file, the data of the input data file is set so that the data is loaded at the time of program execution.

Finally, the program execution unit 134 executes the operation testing program and reconstructs a sequence of operations operated on the Web server 400 by the user (S228). For the functions requiring the data of the input data file, the data of the input data loaded when the operation testing program is executed is passed as an argument. In other words, the functions are executed based on the input data obtained dynamically from the input data file.

FIG. 15 is a screen view showing the function setting screen 210. FIG. 15 is the function setting screen 210 showing "SearchEntered.exl" described later in conjunction with FIG. 18. A data file column name column 250 is an area where the column name of an input data file that has recorded input data set in the parameter is specified. The user may describe the input data itself in the input value column 217. Instead, the user may specify the column name of the input data file in the data file column name column 250. If the column name of the input data file is specified in the data file column name column 250, one or more input data set in the column of the input data file will be loaded at the time of the execution of the operation testing program and then passed to the function.

FIG. 16 is a screen view showing the function setting screen 210 according to the second embodiment. In the input value column 217 corresponding to a "department name search" parameter in FIG. 16, a list of candidates for the input data is displayed in a drop-down list 252. The candidates for the input data displayed in the drop-down list 252 are those displayed in the drop-down list on a Web page. The user can select input data from the dropdown list 252, so that a user's burden required for the setting of the input data can be reduced.

In order to set the drop-down list 252, the operation detector 115, when the user performs a data input operation on the Web page, acquires the candidates for the input data displayed in the drop-down list of said Web page. For example, the operation detector 115 acquired the candidates for the input data in the drop-down list, from data of the Web page acquired from the Web server 400 (e.g., HTML data). The operation recording unit 137 records the candidates for the input data in the input value column 217 of the operation input file. When the input value column 217 is entered, the function setting screen display unit 120 displays a list of candidates for the input data recorded in the operation input file in a drop-down list format.

FIGS. 17A and 17B are each a screen view showing the input setting screen 230 according to the second embodiment. FIG. 17A shows the input setting screen 230 displaying an input data file "SearchEnterData.xls" whose column name is specified in the function setting screen 210 of FIG. 15 and FIG. 16. A "Full name in Kanji characters" column and a "Full name in Kana characters" column of FIG. 17A are specified in FIG. 15 and FIG. 16. FIG. 17B shows the input setting screen 230 displaying another input data file "LoginData2.xls". A description of the input data files in FIGS. 17A and 17B will be given later in conjunction with FIG. 18.

FIG. 18 is a screen view showing the case setting screen 240 according to the second embodiment. The basic execution sequence of each execution set is set in an execution number column 253, whereas the identification information of a test case is set in a test case ID column 254. The identification information indicating a group for which the repetitive processing of an execution set is performed is set in a group ID column 256, whereas the reference range of an input data file in the operation test is set in a row number column 258. An operation input file in each execution set is set in an operation input file column 260, whereas an input data file of each execution set is set in an input data file 262. The setting content of the case setting screen 240 is stored in the case file storage 148 as a case file.

As an execution button 264 is pressed down in the case setting screen 240, the program generator 132 generates an operation testing program according to the case file and the operation input file. More specifically, the program generator 132 generates a single operation testing program in which the functions recorded in each operation input file are set in the program codes, based on one or more operation input files. For example, the program generator 132 generates a single operation testing program used to execute a registration case and generates a single operation testing program used to execute a search case, according to the case file that has recorded the content of the case setting screen 240. Note here that a "single operation testing program" means a program executed as an executable unit, namely a program the execution of which is triggered by each execution instance, and does not mean or depend on the physical number of programs.

When executing one function recorded in each operation input file, the program execution unit 134 passes the data of a column associated with said function in an operation input file, among data of the input data file associated with the operation input file, to said function.

Also, the program execution unit 134 handles a plurality of execution sets to which the same group ID has been assigned in the same test case, as the same group on which the same repetitive processing is to be performed. More specifically, a plurality of execution sets to which the same group ID has been assigned are each executed repeatedly and, with every repetitive processing thereof, a predetermined number of records is passed to a function recorded in the operation input file of each execution set. Assume in the second embodiment that, with every repetition, one record recorded in the input data file is passed to the function. Note also that an operation testing program in which a repeat instruction to execute the above-described processing is set in a program code may be generated by the program generator 132.

For an execution set to which a row number is specified, the program execution unit 134 passes the input data specified by the row number of the input data file, to the function recorded in said operation input file. Thus, if the repetitive processing is specified by a group ID and also a row number is specified, the processing will be repeated as many times as the number of rows specified. For example, in a registration case of FIG. 18, no group lying across different execution sets is set; for each execution set, the processing equivalent to one piece of input data is executed. In contrast thereto, in a search case of FIG. 18, the processing equivalent to one piece of input data is repeated three times for each execution set.

More specifically, at the first repetition, data of "LoginData2.xls" at the 35th row thereof, which is "t_yamada" is passed to the function recorded in "Login2.xls". Then, data of "Full name in Kanji" at the first row of "SearchEnterData.xls" which is "Yamada Taro" in Kanji characters is passed to the function recorded in "SearchEntered.xls", namely the function at No. 1 of FIG. 15. Also, data of "Full name in Katakana" at the first row of "SearchEnterData.xls" which is "Yamada Tao" in Katakana characters is passed to the function at No. 2 of FIG. 15.

At the second repetition, data of "LoginData2.xls" at the 36th row thereof, which is 24 "h_yamada" is passed to the function recorded in "Login2.xls". Then, data of "Full name in Kanji" at the second row of "SearchEnterData.xls" which is "Yamada Hanako" in Kanji characters is passed to the function at No. 1 of FIG. 15 recorded in "SearchEntered.xls". Also, data of "Full name in Katakana" at the second row of "SearchEnterData.xls" which is "Yamada Hanako" in Katakana characters is passed to the function at No. 2 of FIG. 15.

Similarly, at the third repetition, input data at a row number which has been incremented is passed to each function.

By employing the operation verifying apparatus according to the second embodiment, the previously described advantageous effects as those achieved by the first embodiment is achieved as well. More specifically, the processing and the parameters can be separated from each other, and the settings made via the GUI are achieved. Thus, programs of stabilized quality can be easily generated while the diversity of logics included in the operation testing program is assured. Also, the setting of the input data file makes it easy to broaden the variation of the operation test. Further, the setting of the case file allows the execution of the operation test in various types of scenarios.

Further, the operation verifying apparatus 100 according to the second embodiment is structured such that an execution engine function of executing the operation testing program and a wrapper function of achieving the efficient use of the execution engine work seamlessly in cooperation with each other without the need for mediation by the user. Thus a user's burden required for the execution of the operation test can be reduced. Also, different from the case where the operation verifying apparatus 100 according to the first embodiment is used, the user has no need to be conscious of the environment for the execution of programs such as projects for QTP. That is, it is only necessary that the user sets an operation input file and an input data file both using the format the user can easily understand and operate. As a result, the user can easily implement the operation test.

Also, in the operation verifying apparatus 100 according to the second embodiment, each operation testing program in which a plurality of execution sets in the same test case are gathered and aggregated is generated and then the each operation testing program is executed. As compared with the execution for every execution set in the operation verifying apparatus according to the first embodiment, namely the execution for every QTP project generated based on the execution set therein, the overhead incurred when a sequence of operation tests in each test case is reduced in the second embodiment, thereby achieving a fast operation test.

The present invention has been described in conjunction with the second embodiment. Modifications to the second embodiment are now described below.

The operation verifying apparatus 100 according to the second embodiment further allows the setting of a group where a plurality of execution sets are repeatedly executed.

Thereby, the execution sets can be flexibly divided into smaller sets and therefore the scenario of an operation test can be set in a flexible manner. Thus, if the input data files are identical to each other, the reference range can be flexibly changed according to the scenario and therefore the diversified variations of operation tests can be easily achieved.

In the above-described second embodiment, the drop-down list 252 is shown as an example where the setting of values in the function setting screen 210 is assisted. In a modification, the candidates for the input data selectably displayed with radio boxes, check boxes, list boxes or the like in a Web page may be selectably displayed on the functions setting screen 210 using the drop-down list 252 or other formats. That is, when the data input is operated on a device whose operation is to be verified, the candidates for the input data selectably displayed for the user in various formats may be selectably displayed when values on the function setting screen 210 are to be set.

In the above-described first embodiment, the operation verifying apparatus 100 prepares an operation testing program on the condition that a user operation to the Web server 400 is received by QTP and then a log is generated. Also, in the above-described second embodiment, the user's operation to the Web server 400 is detected by the operation verifying apparatus 100 and then the operation testing program is prepared. As a modification, the operation testing program may be generated at the time when the operation verifying apparatus 100 has obtained an HTML file from the Web server 400. In such a case, the operation verifying apparatus 100 searches for a form tag contained in the HTML file and identifies which kind of interface is included in the HTML file. Then, a function used to input data to each input interface is selected and those functions are arranged in various possible orders. In this manner, the operation testing program can be generated without requiring an explicit Web operation by the user.

Third Embodiment

A problem to be resolved by a third embodiment is now explained. Generally, an operation test of a Web page is conducted as follows. That is, the operation test is conducted in such a manner that an input operation is performed on a Web browser displaying the Web page and its operational result is verified. The operational result after a modification to the Web page needs to be verified by comparing an operational result before the modification with an operational result after the modification. Conventionally, this comparative verification is done visually by the test engineers using a screen image in printed form (on paper). A main object of the third embodiment is to provide a technique capable of easily achieving to compare and verify an operation verification test of a Web page.

In order to resolve the above-described problem, an operation verifying apparatus according to the third embodiment executes a test program to verify an operation of a Web page. This apparatus includes (i) an operation recording unit configured to detect a data input operation performed on the Web page and configured to record a function provided with an interface used to acquire input data inputted to the Web page, in an operation input file wherein the function corresponds to the data input operation, (ii) a program generator configured to generate the test program for reconstructing a sequence of operations, performed on the Web page, by setting a program code according to the function recorded in the operation input file, (iii) a program execution unit configured to execute the test program in such a manner that the input data is acquired from an input data file differing from the operation input file and is passed to the function, (iv) a test result storage configured to record the Web page after an execution of the test program, as test result data, (v) a comparison unit configured to compare previous test result data after a previous execution of the test program with present test result data after the present execution of the test program, and (vi) a comparison result preparation unit configured to output a comparison result image identifying a difference detected as a result of comparison made by the comparison unit.

By employing this embodiment, an output result obtained from the operation verification test performed on a Web page is verified against an output result in the past and thereby a difference therebetween is identified and outputted onto a screen. Thus, the burden required in comparing and verifying the output results can be reduced. In other words, the outputs in the operation verification test performed on a Web page can be easily compared and verified.

It is to be noted here that test result data of a Web page includes both a case where the test result data thereof is represented by a screen image and a case where it is in the form of a file of a markup language such as HyperText Markup Language (HTML) and eXtensible Markup Language) that configure the output results of the Web page. A detailed description thereof is given hereunder.

A description has been given of the first embodiment and the second embodiment where the operation verifying apparatus 100 prepares the operation testing program of a Web page and then the operation of the Web page is verified. The execution of the operation testing program results in outputting a Web page screen which is an operation result, and then the test result data are stored in the result storage. Since it is desirable that the above-described operation verification be repeatedly conducted every time the Web page is modified, there are a plurality of test result data of a Web page. Note that a Web page on which the operation test is to be performed is hereinafter called "page to be tested (or testing page)" also.

In a conventional practice, whether these test result data are matched with each other or not is verified manually by the test engineers. In other words, both a screen after the operation verification of a Web page at a certain point in time and a screen after the operation verification of a modified Web page are captured and printed out. Then, those printed out are verified against each other and thereby whether there is any error or variance in the operation result or not is visually checked. If the number of modifications increases, the number of screen captures printed will also increase, thus making it difficult to manage them. Also, if the operation result of the Web page comes in more than one page or a great number of values are outputted, visually checking them imposes a heavy burden on the test engineers.

Thus, the third embodiment provides a technique with which the burden required in comparing the output result obtained from the operation verification test performed on a Web page against the output result in the past is reduced.

Figure 19:
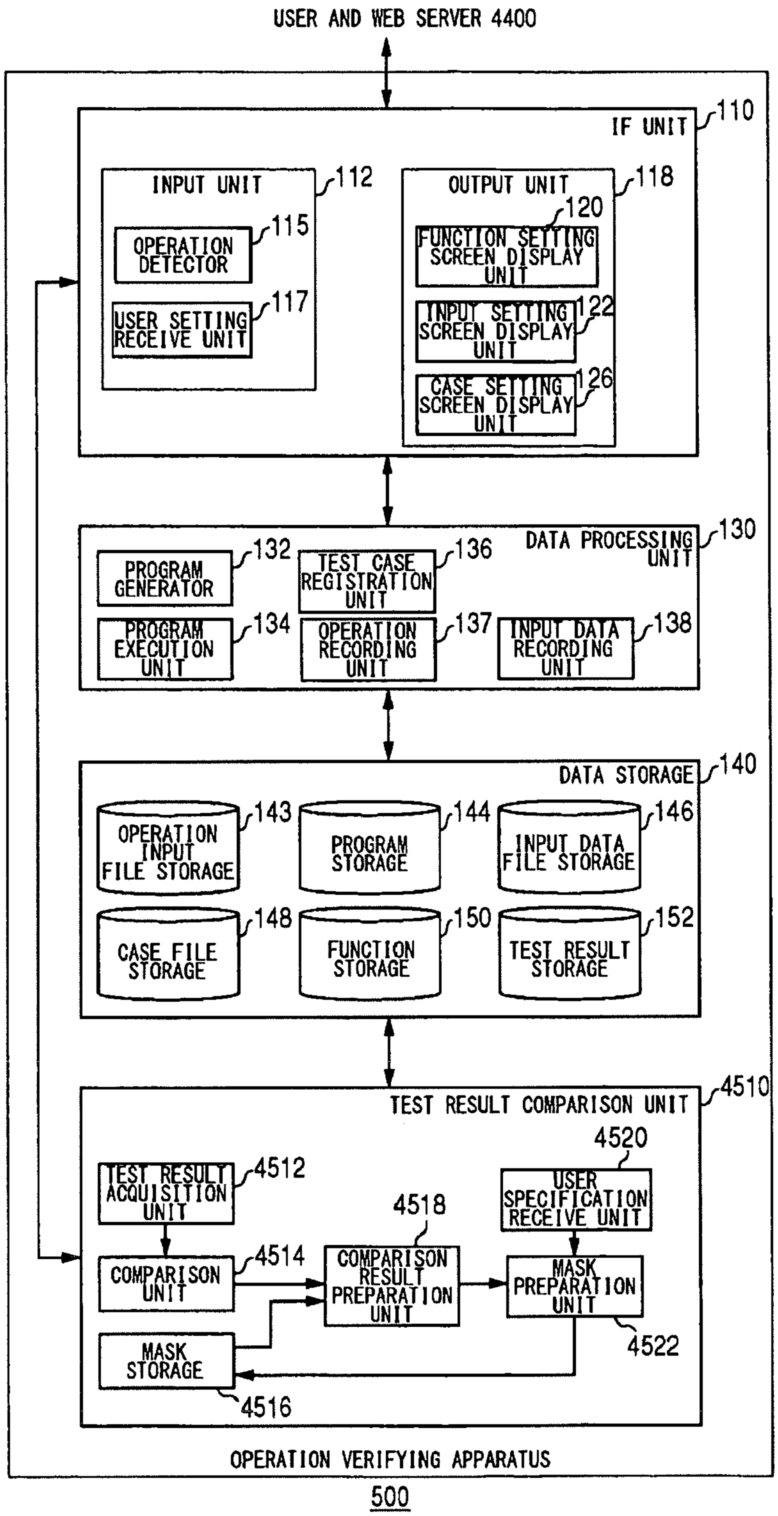
FIG. 19 is a block diagram showing a structure of an operation verifying apparatus according to a third embodiment.
Figure 20:
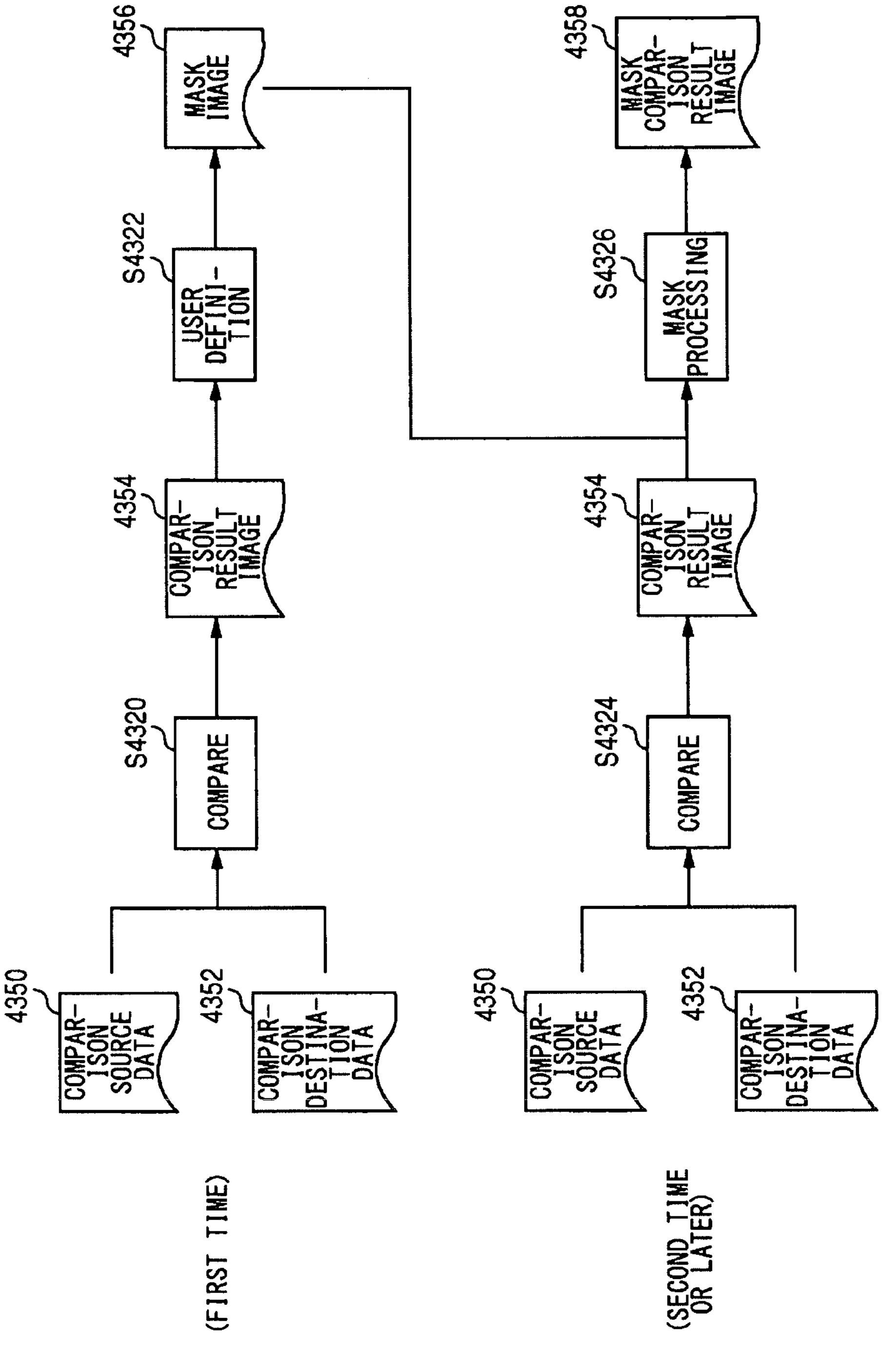
FIG. 20 is a block diagram to explain an operation of a text result comparison unit.

FIG. 19 is a block diagram showing a structure of an operation verifying apparatus 500 according to the third embodiment. In FIG. 19, the functional blocks in the third embodiment corresponding to those in the first embodiment and the second embodiment are given the same reference numerals. For the functional blocks which are given the same reference numerals as those in the first embodiment and the second embodiment, a description thereof will be given hereinbelow if the function thereof differs from that already described in the first embodiment and the second embodiment and will be omitted if it is the same.

The operation verifying apparatus 500 is structured such that a test result comparison unit 4510 is added to the operation verifying apparatus 100. The test result comparison unit 4510 inputs and outputs data to and from the aforementioned IF unit 110 and the data storage 140 as necessary. The test result comparison unit 4510 includes a test result acquisition unit 4512, a comparison unit 4510, a mask storage 4516, a comparison result preparation unit 4518, a user specification receive unit 4520, and a mask preparation unit 4522.

The test result acquisition unit 4512 acquires test result data after the operation verification, recorded in the test result storage 152. This test result data is image data in which the screen output from a Web page is captured. Where the operation result consists of more than one page, it is desirable that the test result be captured into a single piece of image data by scrolling the pages. However, such a test result of more than one page may be divided into a plurality of image data, instead.

The comparison unit 4514 compares the image data of the latest test result with the image data in the past test result, and detects a difference between them. Known image comparison software may be used to compare such image data with each other. For example, a difference between pixels of image data of the latest test result and their corresponding pixels of image data in the past test result is simply computed, so that portions thereof which are matched therebetween become zero and therefore the difference therebetween can be easily detected. Comparing such two sets of image data with each other instead of comparing the texts of the test result allows not only the difference between the tests but also the difference in terms of design to be detected.

The comparison result preparation unit 4518 outputs the image data of the latest test result as a comparison result image while the difference between the previous and the new test result data detected through the comparison made by the comparison unit 4514 is being identified and displayed accordingly. This comparison result image is displayed on a user terminal via the output unit 118 of the IF unit 110. The user can easily grasp the difference between the previous and the new test result data by viewing the portions indicating the difference therebetween identified and displayed on the comparison result image. The difference therebetween identified and displayed may be indicated by shaded regions, in different color, by highlighting the difference, or by underlining the difference, for example, or using any other optional methods.

The mask preparation unit 4522 prepares a mask image by which a part of test result data, in which the user permits the difference between two sets of the test result data, is not identified and displayed. As for the masking range, the user specification receive unit 4520 receives a range specified by the user from the user terminal via the input unit 112 and then delivers it to the mask preparation unit 4522. The thus prepared mask image is stored in the mask storage 4516 and is used for the comparison between two sets of the subsequent test result data. A detailed description will be given of the preparation of the mask images by referring to FIG. 22 to FIG. 25.

If there is any mask image stored in the mask storage 4516, the comparison result preparation unit 4518 will apply the mask image to the comparison result image and then display it on the user terminal. Through this masking processing, the difference within the masked range is displayed such that a display area identified as the difference is excluded, namely, a normal display is seen.

Subsequently, an operation of the test result comparison unit 4510 is described by referring to FIG. 19. The test result acquisition unit 4512 acquires the image data in the past test result (hereinafter referred to as "comparison source data" also) 4350 and the image data in the latest test result (hereinafter referred to as "comparison destination data" also) 4352. The comparison unit 4514 compares the image data of the latest test result with the image data in the past test result (S4320), and the comparison result preparation unit 4518 prepares a comparison result image 4354. The user references the comparison result image and sets a range which allows the difference between the previous data and the new data, as the masking range (S4322) and the mask preparation unit 4522 prepares a mask image 4356 based on this masking range. For the comparison of the subsequent test results (at the second time and thereafter) (S4324), the comparison result preparation unit 4318 performs masking processing where the mask image is applied to the comparison result images 4354 (S4326). As a result, a post-masking comparison result image 4358, where the display of an identified masking range has been excluded, is generated and then outputted to the user terminal.

Figure 21:
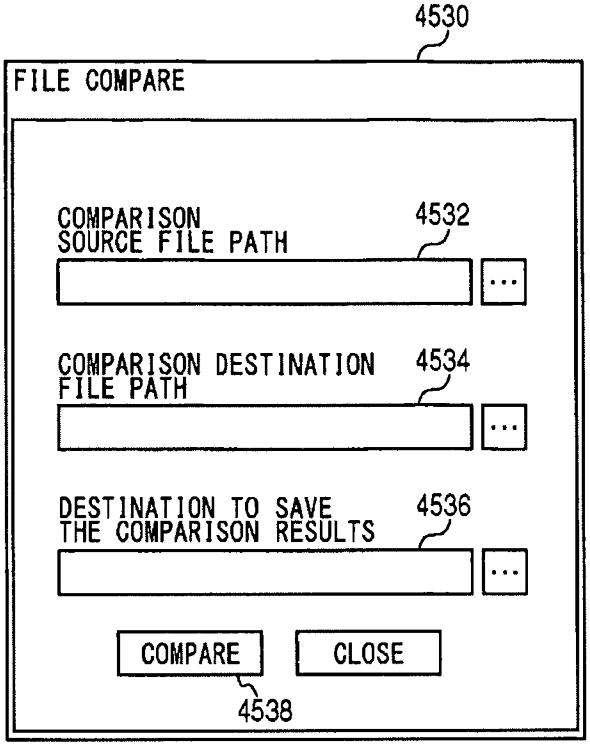
FIG. 21 is an exemplary screen for specifying test result data to be compared.

FIG. 21 is an exemplary screen for specifying the previous and the new test result data to be compared. When the comparison of those test result data is started, the test result acquisition unit 4512 displays a specified screen 4530 on the user terminal. The specified screen 4530 contains a region 4532 to specify a comparison source data file path and a region 4534 to specify a comparison destination data file path, and a region 4536 to specify a region 4536 where the comparison result image data is to be saved. After the file paths have been specified at the respective regions, clicking on a compare button 4538 loads the comparison source data and the comparison destination data, which in turn starts the comparison processing.

If the comparison source data and the comparison destination data are not stored as a single item of image data but stored as a plurality of image data per page, a configuration may be such that a directory storing a plurality of image data in a unified manner can be specified as a file path. In such a case, the comparison unit compares the image data for each page where the comparison source data and the comparison destination data are associated with each other, and the comparison result preparation unit prepares a comparison result image per page. Also, a configuration may be such that a comparison result image on a page, where a difference is found between comparison source data and comparison destination data, and a comparison result image on a page, where no difference is found therebetween, can be stored in different directories, respectively.

FIG. 22 and FIG. 24 each shows an example of test result image data prepared by a Web page the operation of which is to be tested. Assume herein that a page to be tested creates a schedule table that manages the schedule of a plurality of conference spaces on a daily basis. Assume also that FIG. 22 shows image data 4540 indicating a test result in the past and FIG. 23 shows image data 4550 indicating a test result this time. Comparing FIG. 22 and FIG. 23, it is found that the both schedule tables in FIG. 22 and FIG. 23 are prepared correctly but the dates in the schedule tables differ because the dates on which the operation verification tests were performed differ from each other.

Since the dates in the previous and the current test result image data differ, the comparison result preparation unit 4518 prepares a comparison result image 4560 as shown in FIG. 24. In the comparison result image 4560, portions indicating the dates are shaded (indicated by the reference numerals 4562 in FIG. 24) so as to identify and display them. In this manner, simply searching for the thus identified and displayed portions by referencing the comparison result image 4560 allows the user to easily grasp the difference between the previous and the current test result data.

However, as described above, the dates in the test results naturally differ depending on when the operation verification test is conducted. It is desirable therefore that those differences be identified and displayed as difference points. Hence, the mask preparation unit 4522 prepares a mask image to mask the portions where the user allows the difference.

FIG. 25 shows an example of such a mask image 4570. As shown in FIG. 25, the portions corresponding to the dates are specified as the masking range 4572. The user himself/herself can specify this masking range via the user specification receive unit 4520. For example, the masking range is specified in a manner such that the portions where the test results may be allowed to differ are surrounded using a pointer or mouse on the comparison result image 4560. As the mask range is specified by the user, the mask preparation unit 4522 prepares a mask image as those masking ranges. When the subsequent test results are compared, the comparison result preparation unit applies the mask image to each comparison result image so that the display areas of the identified portions corresponding to the masking ranges are excluded and displayed accordingly.

In addition to the aforementioned dates, examples of the range within which the user permits the difference in a comparison result, namely the portions to be specified as the masking range may include numbers indicating statistical results or stock prices updated daily, the results of Web search, images switched on a daily basis, and mere decorative images that do not affect the operation of Web pages. Note that those examples described above should not be considered as limiting.

Figure 26:
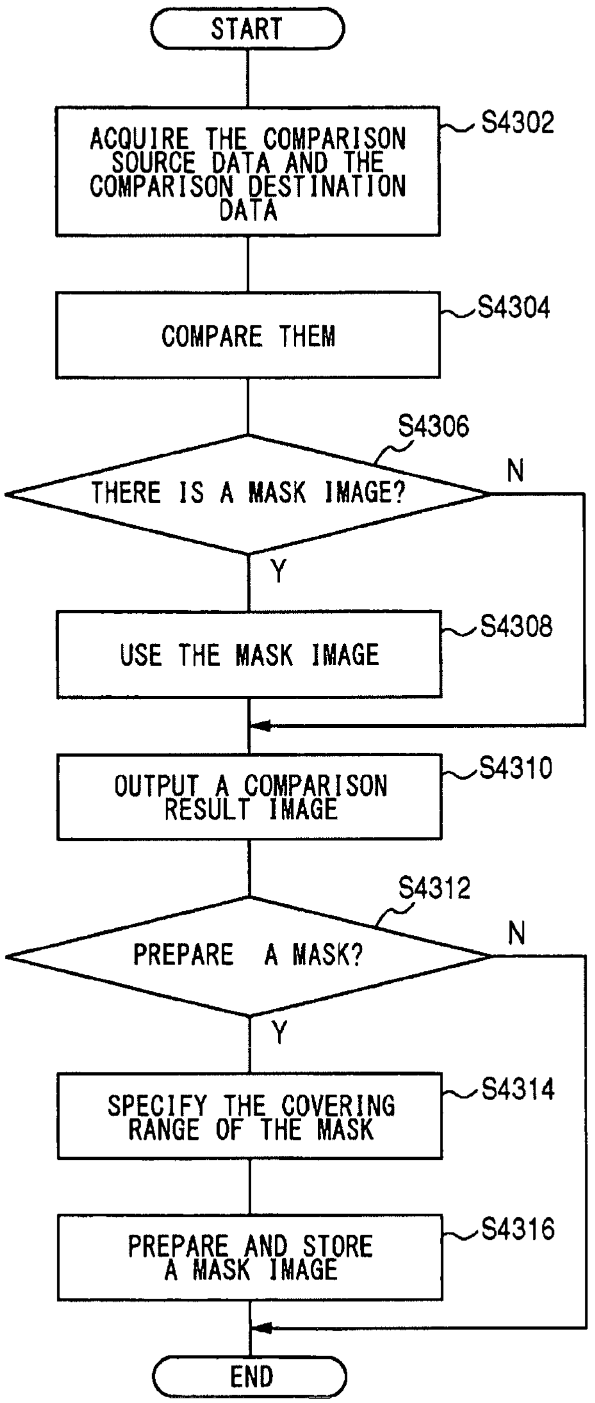
FIG. 26 is a flowchart showing a test result comparison processing according to a third embodiment.

FIG. 26 is a flowchart showing a test result comparison processing according to the third embodiment.

The test result acquisition unit 4512 acquires the comparison source data and the comparison destination data for the operation verification test, from the test result storage 152 (S4302). The comparison unit 4514 compares the comparison source image data and the comparison destination image data with each other, and detects a difference therebetween if any (S4304). The comparison result preparation unit 4518 checks if there is any mask image stored in the mask storage 4516 (S4306) and outputs a comparison result image displaying an identified difference (S4310)) if there is no mask image (N of S4306).

The mask preparation unit 4522 makes an inquiry to the user as to whether he/she prepares a mask image using the comparison result image or not (S4312). If the user prepares the mask image (Y of S4312), the mask preparation unit 4522 will receive the specification by the user regarding the masking range (S4314), prepare the mask image and store the prepared mask image (S4316). If no mask image is to be prepared (N of S4312), Steps S4314 and S4316 will be skipped.

If there is any mask image in Step S4306 (Y of S4306), the comparison result preparation unit 4518 will apply the mask image to the comparison result image (S4308) and output a post-masking comparison result image where the display of an identified masking range has been excluded (S4310).

As described above, by employing the third embodiment, an output result obtained from the operation verification test performed on a Web page is verified against an output result in the past and thereby a difference therebetween is identified and outputted onto a screen. Thus, the previous and the new test result are easily compared with each other. Also, the range within which the difference between the previous and the new test result data is to be permitted is specified as a mask. Thus an arrangement is achieved such that a display area of the identified masking range shall not be displayed at all even though the results differ. This arrangement can reduce the trouble of checking on a range where the results naturally differ, especially in a case where the operation verification test is repeated a number of times or in a case where the test result contains a plurality of pages therein.

The present invention has been described in conjunction with the third embodiment. Modifications to the third embodiment are now described below.

In the above-described third embodiment, a description has been given of a case where a mask image is prepared based on the range specified by the user. As another method, a mask may be prepared, without involving the user operation, using a difference image between the comparison source image data and the comparison destination image data. For example, suppose that, as a result of a comparison made between the comparison source image data and the comparison destination image data, the test engineers has confirmed that no problem arises except the portion where the user can permit the difference therebetween. In this case, the mask preparation unit may reference the difference image and prepare a mask image in such a manner that a pixel having a partial component of the difference and a predetermined range surrounding said pixel (e.g., a range corresponding to a character in a given text) are set as the masking range.

A description has being given of an example where the image data captured from the screen display of a test result are compared with each other. Note here, however, as long as the operation verification test is performed on a Web page, the test result contains markup language files written in HTML, XML or like language. Thus, as a modification of the third embodiment, a description is hereunder given of a case where HTML files of the test result are compared with each other.

In this modification, test result acquisition unit 4512 acquires an HTML file of the test result from the test result storage 152 as the comparison source data and the comparison destination data. The data are acquired by specifying an HML file path on a file specifying screen as shown in FIG. 21.

Then, the comparison unit 4514 compares the HTML files with each other for each row. If a difference or differences is/are detected, the comparison result preparation unit 4518 will prepare a comparison result HTML file identifying and displaying the portions corresponding to the detected difference(s) and display the execution result. More specifically, the comparison result HTML file is prepared in a format such that the row numbers, corresponding to the differences, in a comparison source HTML file or a comparison destination HTML file and the expected values and the actual values used in the comparison are recorded.

This comparison result HTML file may be used as a mask for the subsequent test result HTML files. If the comparison result HTML file is used directly as the mask, the comparison unit 4514 will determine the row numbers corresponding to the aforementioned differences, as regions to be masked, and exclude the regions-to-be-masked from the difference points. Also, a region that the user wishes to mask may be additionally specified. In such a case, the user additionally specifies a row number of the region-to-be-masked via the user specification receive unit 4520. In response thereto, the mask preparation unit 4522 adds the newly specified row number to the comparison result HTML file that contains the row numbers of the differences in the previous comparison. The comparison unit 4514 compares the subsequent test result HTML file with the comparison result HTML file serving as the mask, for each row. The comparison unit 4514 determines the row numbers contained in the comparison HTML file as the regions-to-be-masked and skips the comparative verification of these regions-to-be-masked.

In the above-described embodiment and the modifications, the test result in the past is used as the comparison source data but this should not be considered as limiting. For example, image data of a desirable test result may be used as the comparison source data and thereby this image data thereof may be used to verify whether the Web page is normally operating or not.

Optional combinations of the aforementioned embodiments and modifications may also be useful as additional modes of the present invention. And it should be understood that new embodiments realized by such combinations and modifications thereof provide their own advantages.

It should be understood by those skilled in the art that the functions to be performed by the constituent features cited in the claims can also be realized by the components shown in the embodiments and modifications thereof alone or in combination.

What is claimed is:

1. An apparatus for performing an operational test, comprising:

a memory to store instructions; and a processor coupled to the memory to execute the instructions which configure the processor to:

detect an operation performed by a user on a device;

identify, from a function library, one or more functions associated with the operation performed by the user from among the functions corresponding to the detected operation;

record one or more functions corresponding to the detected operation; and execute the operational test using one or more of the recorded functions.

2. The apparatus of claim 1, wherein the processor is configured to execute the operational test by generating a test program using one or more of the recorded functions.

3. The apparatus of claim 2, wherein the processor is further configured to set input data to be used by the test program and to associate the input data with the test program.

4. The apparatus of claim 3, wherein the processor is further configured to record a set comprising one or more of the recorded functions of the test program and corresponding input data to be used as an argument of said one or more recorded functions.

5. The apparatus of claim 4, wherein the processor is further configured to record a plurality of said sets and to sequentially execute each of the plurality of sets based on the corresponding input data of each of the plurality of sets.

6. The apparatus of claim 2, wherein the processor is further configured to record a display screen of the device during execution of the test program.

7. The apparatus of claim 1, wherein:

the one or more functions correspond to a data input operation performed on the device; and the apparatus further comprises an input data file having a plurality of input data stored therein;

wherein:

a reference range of the input data file is stored; and the input data in the reference range of the input data file is passed to the one or more functions during the operational test.

8. The apparatus of claim 1, wherein:

the processor is configured to:

execute the operational test by generating a test program using one or more of the recorded functions;

set input data to be used by the test program and to associate the input data with the test program;

record a set comprising one or more of the recorded functions of the test program and corresponding input data to be used as an argument of said one or more recorded functions; and record a plurality of said sets and sequentially execute each of the plurality of sets based on the corresponding input data of each of the plurality of sets;

the one or more functions correspond to a data input operation performed on the device; and the apparatus further comprises an input data file having a plurality of input data stored therein;

wherein:

a reference range of the input data file included in each of the plurality of sets is stored; and the input data in the reference range of the input data file included in each of the plurality of sets is passed to the one or more functions during the operational test.

9. A method for performing an operational test, comprising:

detecting an operation performed by a user on a device;

identifying, from a function library, one or more functions associated with the operation performed by the user from among the functions corresponding to the detected operation;

recording one or more functions corresponding to the detected operation;

displaying a list of the one or more recorded functions; and executing the operational test using one or more of the functions in the displayed list.

10. The method of claim 9, wherein the executing step comprises generating a test program using one or more of the functions in the displayed list.

11. The method of claim 10, further comprising setting input data to be used by the test program and associating the input data with the test program.

12. The method of claim 11, further comprising recording a set comprising one or more of the recorded functions of a test program and corresponding input data to be used as an argument of said one or more recorded functions.

13. The method of claim 12, further comprising recording a plurality of said sets and sequentially executing each of the plurality of sets based on the corresponding input data of each of the plurality of sets.

14. The method of claim 10, further comprising recording a display screen of the device in the test program during execution of the test program.

15. The method of claim 9, wherein:

the one or more functions correspond to a data input operation performed on the device; and the method further comprises:

providing an input data file having a plurality of input data stored therein;

storing a reference range of the input data file; and passing the input data in the reference range of the input data file to the one or more functions during the operational test.

* * * * *